United States Patent
Kawamura et al.

(10) Patent No.: US 11,321,255 B2
(45) Date of Patent: May 3, 2022

(54) PACKET PROCESSING DEVICE AND PACKET PROCESSING METHOD

(71) Applicant: Nippon Telegraph and Telephone Corporation, Tokyo (JP)

(72) Inventors: Tomoaki Kawamura, Tokyo (JP); Saki Hatta, Tokyo (JP); Shoko Oteru, Tokyo (JP); Koji Yamazaki, Tokyo (JP); Takahiro Hatano, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/057,067

(22) PCT Filed: May 13, 2019

(86) PCT No.: PCT/JP2019/018931
§ 371 (c)(1),
(2) Date: Nov. 19, 2020

(87) PCT Pub. No.: WO2019/225379
PCT Pub. Date: Nov. 28, 2019

(65) Prior Publication Data
US 2021/0141751 A1    May 13, 2021

(30) Foreign Application Priority Data
May 23, 2018  (JP) .............................. JP2018-098548

(51) Int. Cl.
*G06F 13/16* (2006.01)
*G06F 13/28* (2006.01)
(Continued)

(52) U.S. Cl.
CPC ............ *G06F 13/28* (2013.01); *G06F 13/128* (2013.01); *G06F 13/1668* (2013.01); *G06F 13/364* (2013.01)

(58) Field of Classification Search
None
See application file for complete search history.

(56) References Cited

U.S. PATENT DOCUMENTS 5,933,654 A * 8/1999 Galdun .................. G06F 13/28
710/23
6,823,403 B2 * 11/2004 Gulick ............... G06F 12/0879
710/22
(Continued)

FOREIGN PATENT DOCUMENTS

| JP | 2006302246 A | 11/2006 |
| JP | 2010004262 A | 1/2010 |
| JP | 4468332 B2 | 3/2010 |

*Primary Examiner* — Michael Sun
(74) *Attorney, Agent, or Firm* — Slater Matsil LLP

(57) ABSTRACT

A packet processing apparatus includes a line adapter configured to receive packets from a communication line, a packet combining unit configured to generate a combined packet by combining a plurality of packets received from the communication line, a packet memory configured to store packets received from the communication line, and a combined packet transferring unit configured to DMA transfer the combined packet generated by the packet combining unit to the packet memory. The combined packet transferring unit determines an address of start data of each packet inside the combined packet on the packet memory, writes information on the address into the descriptor that is a predetermined data area on a memory, and DMA transfers the combined packet to the packet memory.

10 Claims, 24 Drawing Sheets

(51) Int. Cl.
 *G06F 13/12* (2006.01)
 *G06F 13/364* (2006.01)

(56) References Cited

U.S. PATENT DOCUMENTS

| | | | |
|---|---|---|---|
| 8,386,908 B2* | 2/2013 | Chen | G06F 13/28 |
| | | | 714/807 |
| 2002/0101872 A1 | 8/2002 | Boivie | |
| 2004/0233933 A1 | 11/2004 | Munguia | |
| 2006/0104303 A1* | 5/2006 | Makineni | H04L 69/161 |
| | | | 370/463 |
| 2008/0240111 A1* | 10/2008 | Gadelrab | H04L 49/9063 |
| | | | 370/395.7 |
| 2015/0378737 A1* | 12/2015 | Debbage | G06F 5/14 |
| | | | 712/225 |
| 2016/0056905 A1* | 2/2016 | Hartlmueller | H04J 3/0697 |
| | | | 375/354 |
| 2021/0034559 A1 | 2/2021 | Kawamura et al. | |

* cited by examiner

PACKET PROCESSING DEVICE AND PACKET PROCESSING METHOD

CROSS-REFERENCE TO RELATED APPLICATIONS

This application is a national phase entry of PCT Application No. PCT/JP2019/018931, filed on May 13, 2019, which claims priority to Japanese Application No. 2018-098548, filed on May 23, 2018, which applications are hereby incorporated herein by reference.

TECHNICAL FIELD

The present disclosure relates to a packet processing apparatus and a packet processing method, and in particular, to a packet processing apparatus and a packet processing method for performing a packet data transferring process in a communication system.

BACKGROUND

FIG. 17 is a block diagram illustrating a configuration of a packet processing apparatus in a related art. The packet processing apparatus includes a line adapter 100 that receives packets from a communication line, a packet memory 101 that stores packets received from the communication line, a packet transferring unit 102 that transfers packets received from the communication line to the packet memory 101, a reception processing unit 103 that reads packets from the packet memory 101, and a protocol processing unit 104 that performs protocol processes on packets.

In the packet processing apparatus, upon arrival of a packet at the line adapter 100 connected to a communication line (not illustrated), the packet transferring unit 102 performs data transfer using a Direct Memory Access (DMA), and stores the packet that has arrived in the packet memory 101. At the same time, the packet transferring unit 102 generates a hardware interrupt to notify a processor (not illustrated) of the packet processing apparatus of the reception of a packet, and requests to activate the reception processing unit 103.

The packet transferring unit 102 includes a descriptor 1020 that is a data structure built by software executed by the processor of the packet processing apparatus, and a DMA controller 1021 that is hardware. FIG. 18 is a diagram illustrating an overview of the descriptor 1020.

The example illustrated in FIG. 18 illustrates a case in which the packet memory 101 stores N packets. In this case, the processor of the packet processing apparatus sets an address and a flag corresponding to each of the N packets in the descriptor 1020. The processor sets start addresses A #1 to A #N used when received packets are written into the packet memory 101 in the descriptor 1020 in advance. Generally, the number of addresses that can be simultaneously set is determined in advance, and the sequence of addresses to be used is also determined.

The processor sets/resets flags AF #1 to AF #N, which indicate whether the set addresses A #1 to A #N are valid for the descriptor 1020. After setting the addresses A #1 to A #N, when the processor validates the flags AF #1 to AF #N, packets can be written into the packet memory 101.

In addition, in the descriptor 1020, reception completion flags WF #1 to WF #N indicating whether writing of packets into the set addresses A #1 to A #N has been completed, and received data sizes L #1 to L #N indicating packet lengths of packets that have been written to the set addresses A #1 to A #N are set.

FIG. 19 is a flowchart illustrating operations of the DMA controller 1021. First, the DMA controller 1021 initializes a variable n, which indicates the sequence of reading and writing of the descriptor 1020, to "1" (step S100 in FIG. 19) and reads the flag AF #1 of n=1 from the descriptor 1020 (step S101 in FIG. 19).

When the flag AF #1 indicates that the start address is valid (yes in step S102 in FIG. 19), the DMA controller 1021 reads the start address A #1 of n=1 from the descriptor 1020 (step S103 in FIG. 19) and writes a corresponding packet of n=1 into an area starting from the start address A #1 of the packet memory 101 (step S104 in FIG. 19).

After completing the writing of the packet, the DMA controller 1021 writes a received data size L #1 indicating the packet length of the packet of n=1 and the reception completion flag WF #1 indicating that the writing of the packet has been completed into the descriptor 1020 (step S105 in FIG. 19).

In addition, hardware interruption is generated to notify the processor (not illustrated) of the packet processing apparatus of the completion of writing of the packet, and the reception processing unit 103 is requested to be activated.

Then, the DMA controller 1021 determines whether the variable n is equal to N (step S106 in FIG. 19). When the variable n has not reached N (no in step S106), the DMA controller 1021 increases the variable n by one (step S107 in FIG. 19) and returns the process to step S101. When the variable n has reached N (yes in step S106), the DMA controller 1021 returns the process to step S100. In this way, N packets are sequentially transferred to the packet memory 101.

Next, the activated reception processing unit 103 delivers the received packet that has been transferred to the packet memory 101 to the protocol processing unit 104. At the same time, the reception processing unit 103 secures an area of a new packet memory 101 from memories included in the packet processing apparatus to supplement a packet memory corresponding to packets that have been delivered to the protocol processing unit 104.

When the necessary protocol process ends, the protocol processing unit 104 to which the received packets have been delivered releases an area of the packet memory 101.

As described above, in a general reception process, it is known that, in particular, when small packets arrive at a high frequency, the number of interruptions of hardware increases, and thus, the processor of the packet processing apparatus experiences a high load, and the reception performance is reduced. In addition, it is known that the number of times of DMA transfer activation increases, and thus the reception performance is reduced due to an overhead accompanying DMA transfer control.

In order to handle such problems, a technique for combining a plurality of small packets into one large combined packet until a threshold set in a line adapter is reached and DMA transferring the combined packet to a packet memory altogether upon the size of the combined packet reaching the threshold as a trigger has been proposed (see Patent Literature 1).

By using such a DMA transfer system of combining a plurality of small packets into one combined packet and transferring the combined packet (hereinafter, referred to as collective DMA transfer), even when small packets arrive at a packet processing apparatus, the number of times of hardware interruption can be reduced, and the overhead of the DMA transfer can be reduced, whereby a high-speed reception process can be performed.

FIG. 20 is a block diagram illustrating a configuration of a packet processing apparatus in a related art disclosed in Patent Literature 1. This packet processing apparatus includes a line adapter 100, a packet memory 101, a combined packet transferring unit 102a, a reception processing unit 103, a protocol processing unit 104, a reception buffer 105, a packet combining unit 106, and a combination threshold control unit 107.

In the packet processing apparatus illustrated in FIG. 20, the packet combining unit 106 transfers packets received by the line adapter 100 to a reception buffer 105 for combining packets. At this time, the packet combining unit 106 stores packets in the reception buffer 105 such that one combined packet is formed by combining a packet received by the line adapter 100 and packets that have already been stored in the reception buffer 105. When the size of the combined packet in the reception buffer 105 exceeds a threshold set in the combination threshold control unit 107 in advance, the packet combining unit 106 issues a transfer request for the combined packet to the packet memory 101.

Similar to the case illustrated in FIG. 17, the combined packet transferring unit 102a includes a descriptor 1020a and a DMA controller 1021a. FIG. 21 is a diagram illustrating an overview of the descriptor 1020a. The example illustrated in FIG. 21 illustrates a case in which N combined packets are stored in the packet memory 101. In this case, the processor of the packet processing apparatus sets an address and a flag corresponding to each of the N combined packets in the descriptor 1020a.

The processor sets start addresses AD #1 to AD #N, which are used when the combined packet is written into the packet memory 101, in the descriptor 1020a in advance. Generally, the number of addresses that can be simultaneously set is determined in advance, and the sequence of addresses to be used is also determined.

The processor sets/resets flags ADF #1 to ADF #N indicating whether the set addresses AD #1 to AD #N are valid for the descriptor 1020a. After setting the addresses AD #1 to AD #N, when the processor validates the flags ADF #1 to ADF #N, a combined packet can be written into the packet memory 101.

In addition, in the descriptor 1020a, reception completion flags WDF #1 to WDF #N indicating whether writing of combined packets into the set addresses AD #1 to AD #N has been completed and received data sizes LD #1 to LD #N indicating lengths of combined packets written into the set addresses A #1 to A #N (total values of packet lengths of combined packets) are set.

FIG. 22 is a flowchart illustrating operations of the DMA controller 1021a. First, the DMA controller 1021a initializes a variable n, which indicates the sequence of reading and writing of the descriptor 1020a to "1" (step S200 in FIG. 22) and reads a flag ADF #1 of n=1 from the descriptor 1020a (step S201 in FIG. 22).

When the flag ADF #1 indicates that the start address is valid (yes in step S202 in FIG. 22), the DMA controller 1021a reads the start address AD #1 of n=1 from the descriptor 1020a (step S203 in FIG. 22) and writes a corresponding combined packet of n=1 into an area starting from the start address AD #1 of the packet memory 101 (step S204 in FIG. 22).

After completing the writing of the combined packet, the DMA controller 1021a writes a received data size LD #1 indicating the length of the combined packet of n=1 and a reception completion flag WDF #1 indicating that the writing of the combined packet has been completed into the descriptor 1020a (step S205 in FIG. 22).

In addition, the DMA controller 1021a generates a hardware interruption for notifying the processor (not illustrated) of the packet processing apparatus of the completion of writing of a combined packet, and requests to activate the reception processing unit 103.

Then, the DMA controller 1021a determines whether the variable n is equal to N (step S206 in FIG. 22). When the variable n has not reached N (no in step S206), the DMA controller 1021a increases the variable n by "1" (step S207 in FIG. 22) and returns the process to step S201. When the variable n has reached N (yes in step S206), the DMA controller 1021a returns the process to step S200. In this way, N combined packets are sequentially transferred to the packet memory 101.

The reception processing unit 103 activated in response to the activation request from the combined packet transferring unit 102a (the DMA controller 1021a) delivers a combined packet transferred to the packet memory 101 to the protocol processing unit 104.

By employing the configuration illustrated in FIG. 20, a request for activating a reception process is performed when a combined packet acquired by combining a plurality of packets is transferred, and thus, the number of times of activation of the reception processing unit 103 is reduced, and the load of the processor of the packet processing apparatus is reduced. In addition, the number of times of DMA transfer control is performed is reduced, so that the ratio of an overhead becomes low, and high reception performance can be exhibited.

However, in the configuration illustrated in FIG. 20, the combined packet needs to be restored to a plurality of original packets by the protocol processing unit 104. When this restoration process is to be implemented using hardware of the protocol processing unit 104, a mechanism for the packet combining unit 106 to notify the protocol processing unit 104 of information required for the restoration process (the number of packets of the combined packet and a size of each packet) is required, and thus there is a problem in that the scale of the hardware of the packet combining unit 106 or the like becomes large. In addition, the information required for the restoration process needs to be stored in the packet memory 101 or the like.

Although the restoration process can be implemented by software of the reception processing unit 103 or the like, as described above, a mechanism for the packet combining unit 106 to notify the reception processing unit 103 of information required for the restoration process (the number of packets of the combined packet and a size of each packet) is required, and thus, there is a problem in that the scale of the hardware of the packet combining unit 106 or the like becomes large. In addition, because the restoration process is performed by software, a process according to the software is increased, and the load of the processor becomes high. As a result, there is also a problem in that improvement of the reception performance according to collective DMA transfer is inhibited.

FIG. 23 is a block diagram illustrating another configuration of the packet processing apparatus. In this packet processing apparatus, a combined packet separating unit 108 which restores a combined packet into a plurality of original packets is provided between the reception processing unit 103 and the protocol processing unit 104 of the packet processing apparatus illustrated in FIG. 20.

Similar to a case in which the packet restoration process is implemented by the hardware of the protocol processing unit 104, when the combined packet separating unit 108 is to be implemented by hardware, a mechanism for the packet combining unit 106 to notify the combined packet separating unit 108 of information required for the restoration process (the number of packets of the combined packet and a size of each packet) is required, and thus there is a problem in that the scale of the hardware of the packet combining unit 106 or the like becomes large.

Although the combined packet separating unit 108 can be implemented by software, as described above, a mechanism for the packet combining unit 106 to notify the combined packet separating unit 108 of information required for the restoration process (the number of packets of the combined packet and a size of each packet) is required, and thus, there is a problem in that the scale of the hardware of the packet combining unit 106 or the like becomes large. In addition, because the restoration process is performed by software, a process according to the software is increased, and the load of the processor becomes high. As a result, there is also a problem in that improvement of the reception performance according to collective DMA transfer is inhibited.

FIG. 24 is a block diagram illustrating another configuration of the packet processing apparatus. In this packet processing apparatus, instead of the combined packet transferring unit 102a of the packet processing apparatuses illustrated in FIGS. 20 and 23, a combined packet writing unit 109 using software is provided. Also in a packet processing apparatus not using DMA transfer, there are cases in which effective throughput of writing for the packet memory 101 is improved in accordance with collecting a plurality of packets and writing the packets into the packet memory 101 using software (hereinafter, referred to as collective writing) (a case in which the packet memory 101 is configured by a DRAM or the like). In this way, also for a packet processing apparatus performing collective writing, there are problems similar to those described above when a combined packet is restored to a plurality of original packets.

When all the processes illustrated in FIG. 24 (hardware processes performed inside the packet memory 101 and the line adapter 100 are excluded) are performed using software, information (the number of packets of the combined packet and a size of each packet) required for the restoration process needs to be stored in the packet memory 101 or the like, and there is a problem in that the capacity (the number of writable bits) of the packet memory 101 or the like needs to be larger than that of a case in which collective writing is not performed.

In the configuration of FIG. 20, FIG. 23, or FIG. 24, it is necessary to secure the N×DB_mux (DB_mux is the maximum size of the combined packet) of buffer areas in the packet memory 101. The maximum size DB_mux of the combined packet is a value obtained by adding the maximum allowable packet length to the threshold set in the combination threshold control unit 107. Thus, for example, assuming a threshold of 500 bytes and a maximum allowable packet length of 2000 bytes, the size of the buffer areas that need to be secured in the packet memory 101 is N×2500 bytes.

However, the size of the combined packets transferred to the packet memory 101 in fact is 501 bytes to 2500 bytes, which leads to the problem that a portion of the secured area is wasted. For example, when the size of the combined packet is 501 bytes, 1999 bytes is wasted in the buffer areas secured in the packet memory 101.

CITATION LIST

Patent Literature

Patent Literature 1: JP 4468332B

SUMMARY

Technical Problem

Embodiments of the present disclosure are realized for solving the problems of the technique in a related art described above, and an object of embodiments of the present disclosure is to provide a technique enabling implementation of high reception performance according to effects of collective DMA transfer or collective writing by reducing the scale of hardware required for a process of restoring a combined packet into a plurality of original packets, in a packet processing apparatus using collective DMA transfer using hardware or collective writing using software.

A further object of embodiments of the present disclosure is to provide techniques that allow the size of buffer areas for combined packets that need to be secured in the packet memory as compared to the configurations in the related art.

Means for Solving the Problem

A packet processing apparatus according to embodiments of the present disclosure includes: a line adapter configured to receive packets from a communication line; a packet combining unit configured to generate a combined packet by combining a plurality of packets received from the communication line; a packet memory configured to store packets received from the communication line; and a combined packet transferring unit configured to DMA transfer the combined packet to the packet memory or write the combined packet to the packet memory using a processor, the combined packet having been generated by the packet combining unit, in which the combined packet transferring unit determines an address of start data of each packet in the combined packet, on the packet memory, writes information on the address into a descriptor, which is a predetermined data area on a memory, and DMA transfers the combined packet to the packet memory or writes the combined packet by the processor.

In addition, in one configuration example of the packet processing apparatus according to embodiments of the present disclosure, the combined packet transferring unit writes information of a received data size indicating a packet length of each packet in the combined packet into the descriptor.

In addition, one configuration example of the packet processing apparatus according to embodiments of the present disclosure further includes a processing unit configured to read packets stored in the packet memory, and the processing unit reads the packets from the packet memory based on information written in the descriptor to process the packets.

In addition, a packet processing method according to embodiments of the present disclosure includes: generating a combined packet by combining a plurality of packets received from a communication line; determining, for a packet memory, an address of start data of each packet in the combined packet on the packet memory, wherein a processing unit configured to process the packets received from the communication line reads the packets from the packet memory; writing information on the address into a descriptor, which is a predetermined data area on a memory; and DMA transferring the combined packet to the packet memory or writing the combined packet to the packet memory using the processor.

Effects of Embodiments of the Invention

According to embodiments of the present disclosure, a combined packet transferring unit is configured to DMA transfer a combined packet to a packet memory or to write the combined packet to the packet memory using the processor, wherein the combined packet is generated by a packet combining unit, and is configured to write information of an address on the packet memory of start data of each packet inside a combined packet into a descriptor that is a predetermined data area on a memory. According to a packet processing apparatus including a combined packet transferring unit of embodiments of the present disclosure, the scale of hardware required for the process of restoring a combined packet acquired by combining a plurality of packets into a plurality of the original packets can be smaller than that of a configuration of a technique in a related art, and high reception performance according to effects of collective DMA transfer or collective writing can be implemented. Further, in embodiments of the present disclosure, the combined packet transferring unit determines an address of start data of each packet in the combined packet, on the packet memory, and writes the information on the address into the descriptor, thereby reducing the size of the buffer area for the combined packet that needs to be secured in the packet memory, as compared to the configurations in the related art.

Compared to a case in which the process of restoring a combined packet acquired by combining a plurality of packets to a plurality of the original packets is implemented by software by employing the configuration illustrated in FIG. 20 or illustrated in FIG. 23 in the related art, the process of a processor required for processing one packet requires less load when the process of restoring a combined packet acquired by combining a plurality of packets to a plurality of the original packets is performed by hardware by employing a configuration according to embodiments of the present disclosure. Thus, there is an effect of improving reception performance (increasing the number of packets that can be processed per unit time). In addition, there is also an effect of reduction in processor power consumption required for processing one packet.

DETAILED DESCRIPTION OF ILLUSTRATIVE EMBODIMENTS

First Embodiment

Figure 1:
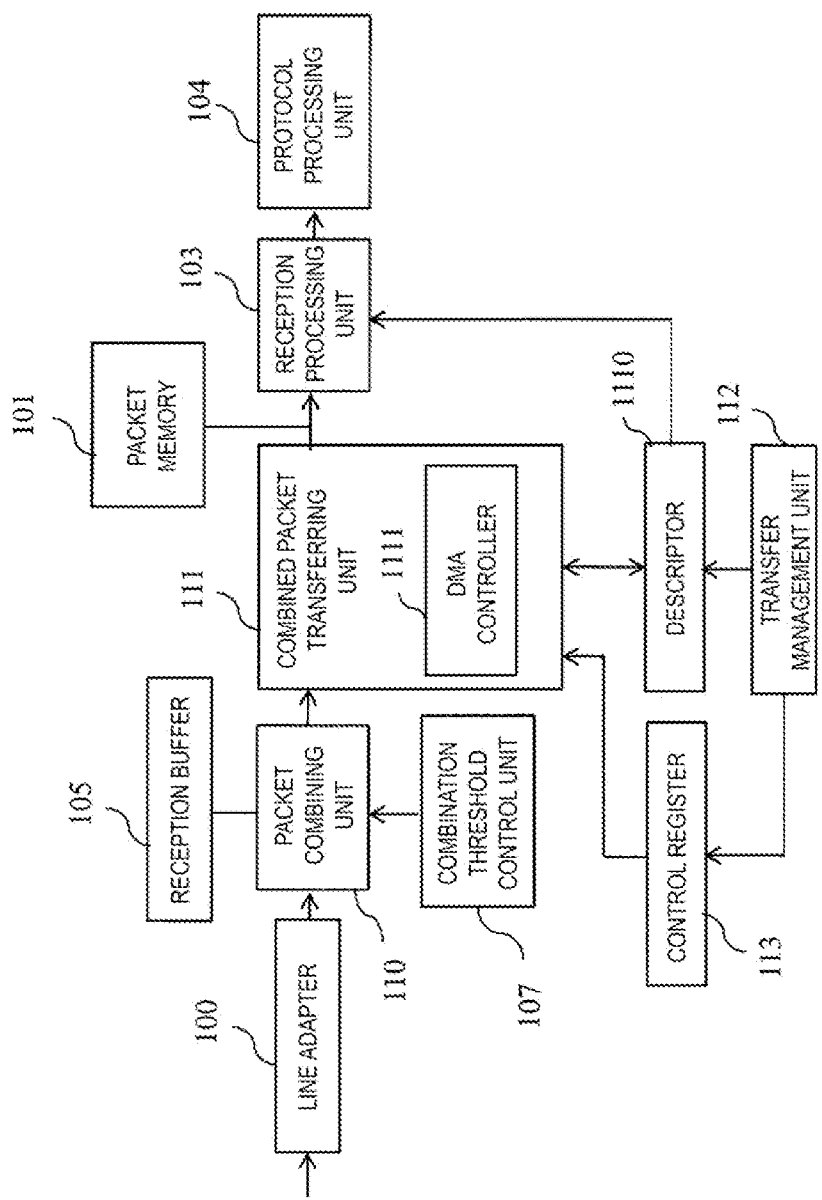
FIG. 1 is a block diagram illustrating a configuration of a packet processing apparatus according to a first embodiment of the present disclosure.

Hereinafter, embodiments of the present disclosure will be described in detail with reference to the drawings. In all the drawings for describing an embodiment, the same reference signs will be assigned to units having the same functions, and repeated description will be omitted. FIG. 1 is a block diagram illustrating a configuration of a packet processing apparatus according to a first embodiment of the present disclosure.

Figure 20:
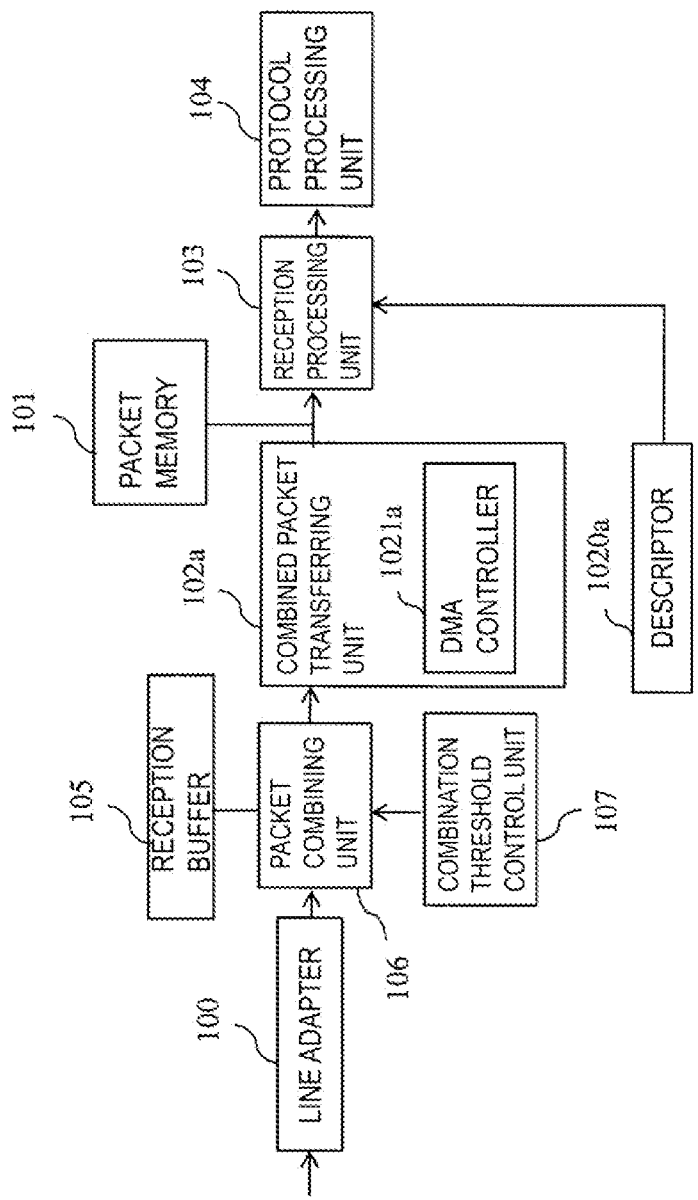
FIG. 20 is a block diagram illustrating another configuration of the packet processing apparatus in the related art.
Figure 21:
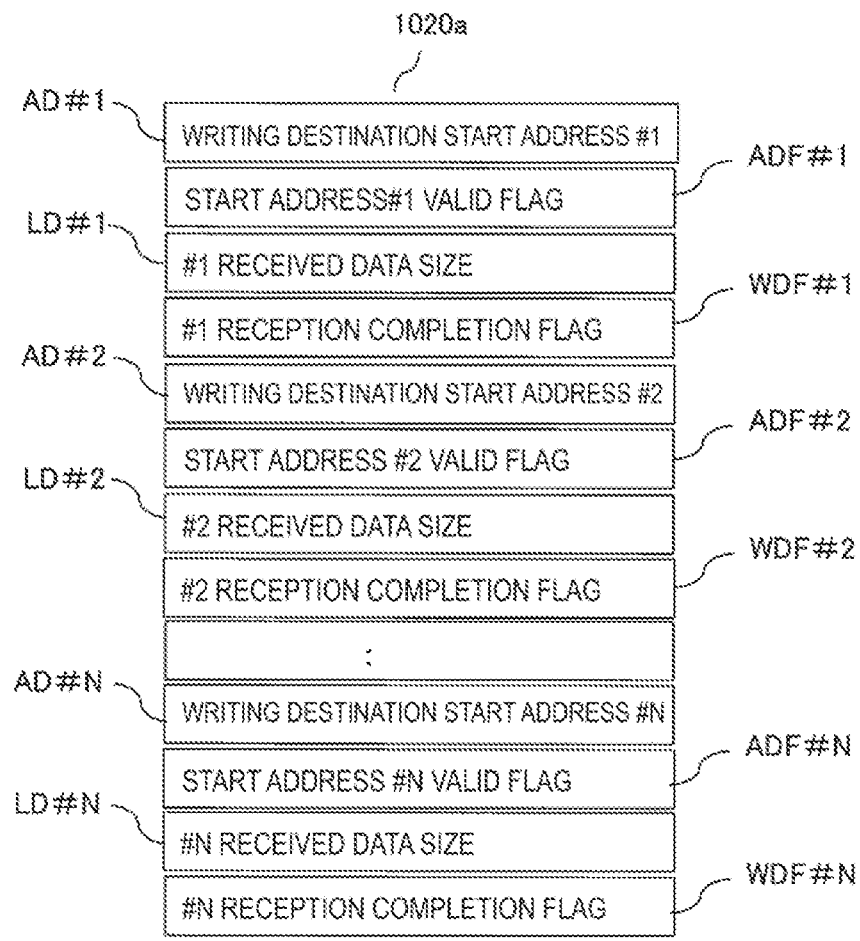
FIG. 21 is a diagram illustrating an overview of a descriptor of the packet processing apparatus illustrated in FIG. 20.
Figure 22:
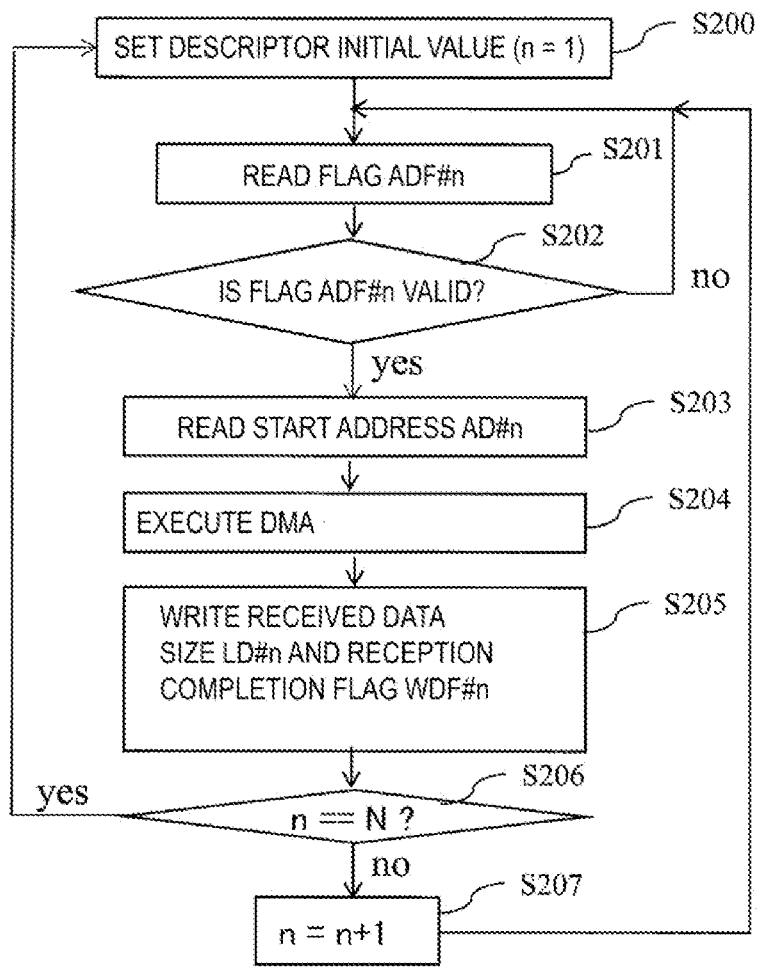
FIG. 22 is a flowchart illustrating operations of the DMA controller of the packet processing apparatus illustrated in FIG. 20.

The packet processing apparatus of FIG. 1, similar to the configuration of FIG. 20, includes a line adapter 100 that is connected to a communication line (not illustrated) and receives data from the communication line, a packet memory 101 that stores packets received from the communication line, a reception processing unit 103 that delivers the packets stored in the packet memory 101 to a protocol processing unit 104 that performs protocol processes on packets, a reception buffer 105 for combining packets, a combination threshold control unit 107 in which a threshold for regulating the size of the combined packet is set in advance, a packet combining unit 110 that combines a plurality of packets received from the communication line in the reception buffer 105 to generate one combined packet, a combined packet transferring unit 111 that DMA transfers the combined packet generated by the packet combining unit 110 to the packet memory 101, and a transfer management unit 112 that performs the initial setting of a descriptor 1110, which is a predetermined data area on a memory, and a control register 113. The transfer management unit 112 may be configured as a part of the reception processing unit 103.

Among these, the line adapter 100, the reception buffer 105 for combining packets, and the combination threshold control unit 107 are equivalent to the configuration illustrated in FIG. 20.

The packet combining unit 110 transfers packets received by the line adapter 100 to the reception buffer 105 for combining packets. At this time, the packet combining unit 110 stores packets in the reception buffer 105 such that a packet received by the line adapter 100 and packets stored in the reception buffer 105 in advance are combined to form one combined packet. When the size of the combined packet in the reception buffer 105 exceeds the threshold set in the combination threshold control unit 107, the packet combining unit 110 issues a transfer request for the combined packet to the packet memory 101.

The packet combining unit 110 may be configured to issue a transfer request when a timeout has occurred (when a reception interval between packets exceeds a period set in advance or the like) before the size of the combined packet in the reception buffer 105 exceeds the threshold.

In addition, the packet combining unit 110 records the number of packets combined in the reception buffer 105 and the size of each packet and notifies the combined packet transferring unit 111 of the number of packets of the combined packet and the size of each packet when issuing a transfer request for a combined packet.

The combined packet transferring unit 111 includes a DMA controller 1111. The combined packet transferring unit 111 transfers a combined packet to the packet memory 101 through one DMA transfer and issues a request for activating the reception processing unit 103 by generating a hardware interruption.

The hardware interruption for the processor (not illustrated) of the packet processing apparatus may not be generated.

In addition, the combined packet transferring unit 11 writes a size or the like into the descriptor 1110 that is prepared for each packet by the transfer management unit 112 (software executed by the processor) by using the information of the number of packets of the combined packet and the size of each packet notified of by the packet combining unit 110. Details of the configuration of the descriptor 1110 and the operations of the combined packet transferring unit in will be described later.

When an activation request is detected, the reception processing unit 103 reads packets stored in the packet memory 101 based on address information and size information written in the descriptor 1110 prepared for each packet and delivers the read packet to the protocol processing unit 104. The operation of the reception processing unit 103 is equivalent to the operation of the configuration illustrated in FIG. 17.

The protocol processing unit 104 performs necessary protocol processes on the packets received from the reception processing unit 103. Then, when the necessary protocol process ends, the protocol processing unit 104 releases an area of the packet memory 101 in which the packets delivered from the reception processing unit 103 are stored. The operation of the protocol processing unit 104 is equivalent to the operation of the configuration illustrated in FIG. 17.

Then, when the necessary protocol process ends and the area of the packet memory 101 in which the packets delivered from the reception processing unit 103 are stored is released, it is determined that the process of S503 in FIG. 8 described later is ended.

The reception processing unit 103, the protocol processing unit 104, and the transfer management unit 112 may be implemented by software running on a general-purpose personal computer or a workstation or may be implemented by hardware such as a Field Programmable Gate Array (FPGA) operating in cooperation with a program.

The packet memory 101 may be configured using a memory on a personal computer, a communication apparatus, or a communication board.

The line adapter 100, the combination threshold control unit 107, and the packet combining unit no may be configured using an FPGA on a communication apparatus or a communication board or the like.

The reception buffer 105 may be configured using a storage area included in an FPGA or the like on a communication apparatus or a communication board or a storage circuit of a First In First Out (FIFO) or the like.

Figure 2:
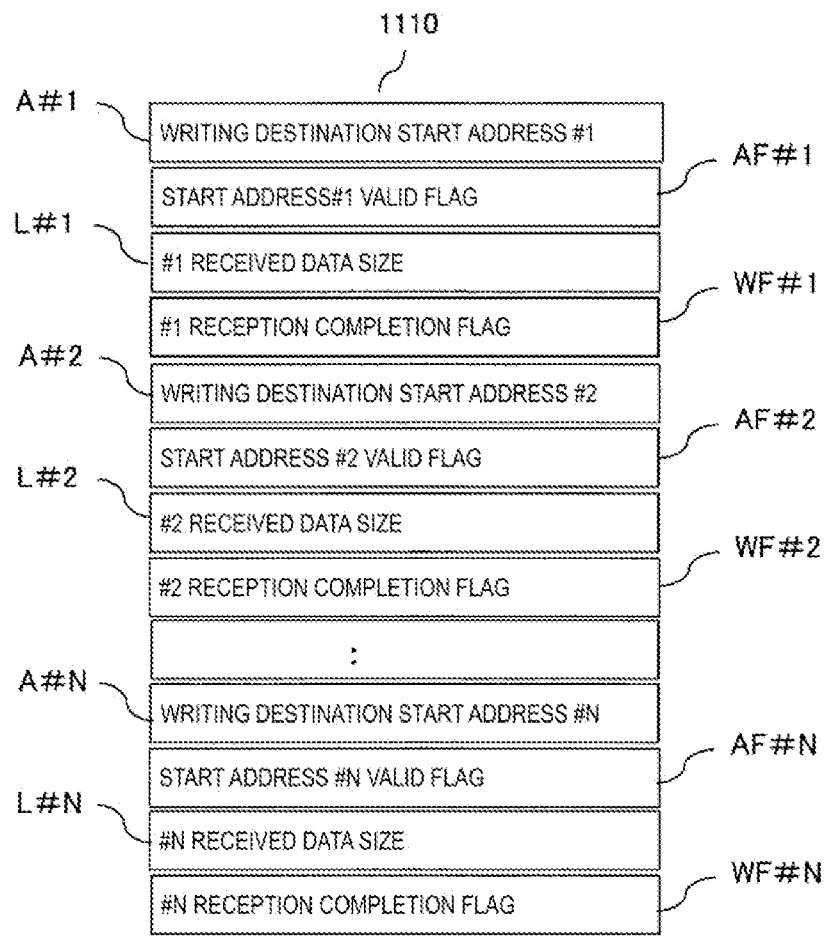
FIG. 2 is a diagram illustrating an overview of a descriptor of a packet processing apparatus according to the first embodiment of the present disclosure.

FIG. 2 illustrates a configuration example of the descriptor 1110 used by the combined packet transferring unit 111 according to the present embodiment. Generally, a data structure that records an address of the packet memory 101 for reception processing or the like is referred to as a descriptor 1110. In the example illustrated in FIG. 2, a case in which N packets are stored in the packet memory 101 is illustrated.

The descriptor 1110 illustrated in FIG. 2 is a data structure in which a plurality of (N sets of) start addresses A #1 to A #N of writing destinations of received packets, valid flags AF #1 to AF #N indicating whether the start addresses A #1 to A #N are valid, received data sizes L #1 to L #N indicating packet lengths of the received packets, and reception completion flags WF #1 to WF #N indicating whether reading of packets from the packet memory 101 has been completed can be written.

The descriptor 1110, similar to the packet memory 101, is actually disposed inside a memory on a personal computer, a communication apparatus, or a communication board.

While the descriptor 1110 can be disposed inside the same memory as the packet memory 101, in such a case, the use of the memory can be divided in accordance with addresses inside the memory.

Here, an operation example of the DMA transfer in the related art using the descriptor 1020 or 1020a for the reception process which is generally used in the configurations of FIGS. 17, 20, and 23 will be described again with reference to FIGS. 18 and 19. The details will be described.

First, the processor of the packet processing apparatus determines start addresses A #1 to A #N of writing destinations of the packets (combined packet) and writes the determined start addresses in the descriptors 1020, 1020*a* and rewrites the valid flags AF #1 to AF #N, which indicate whether the start addresses A #1 to A #N are valid, from "invalid" to "valid".

While there are N sets of areas in the descriptors 1020, 1020*a* in which information of start addresses or the like is written, the writing ("validating") sequence is determined in advance. For example, in the example illustrated in FIG. 18, the processor writes information in a sequence of a first start address A #1, a second start address A #2, . . . , and an N-th start address A #N.

When a first packet (or the combined packet) can be transferred again after the information is written once, start addresses may be written into the descriptor 1020, 1020*a* in a sequence from the first start address A #1. Regarding whether information can be written at the start address A #n (here, n is 1 to N), for example, it may be determined that the writing can be performed when the valid flag AF #n corresponding to the start address A #n is "invalid".

Figure 19:
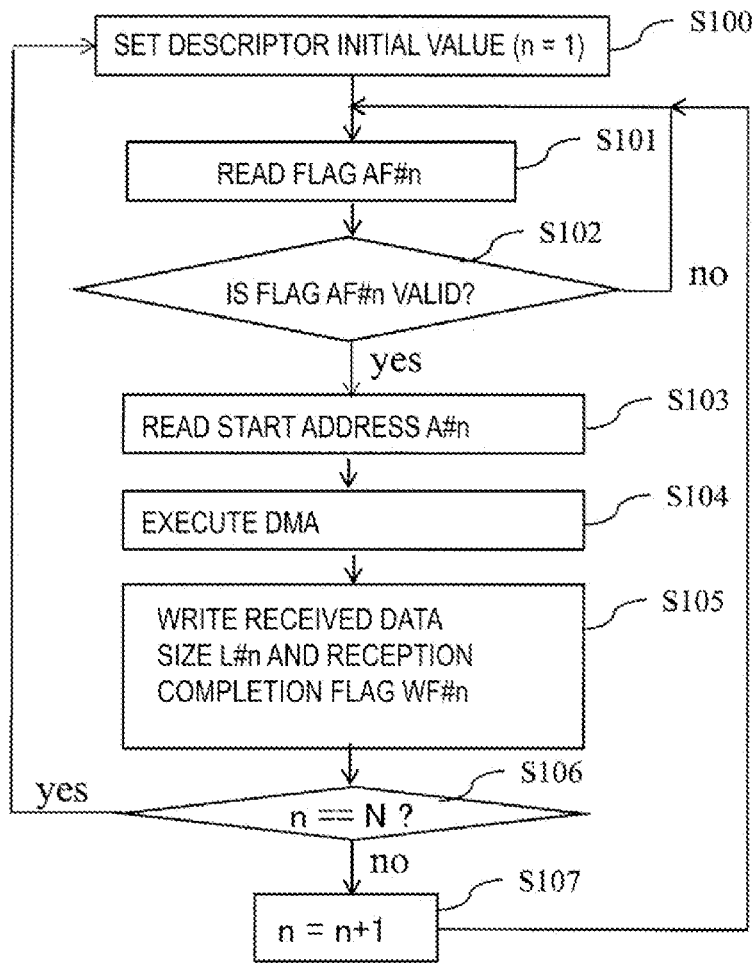
FIG. 19 is a flowchart illustrating operations of a DMA controller of the packet processing apparatus illustrated in FIG. 17.

Next, the DMA controller 1021, 1021*a* checks the valid flag AF #n of the descriptor 1020, 1020*a* and, when the valid flag AF #n indicates that the start address A #n is "valid" (Yes in step S102 in FIG. 19), reads the start address A #n from the descriptor 1020, 1020*a* (step S103 in FIG. 19) and writes a corresponding n-th packet (or combined packet) into an area starting from the start address A #n of the packet memory 101 (step S104 in FIG. 19).

After the completion of this DMA transfer, the DMA controller 1021, 1021*a* writes the received data size L #n indicating the packet length of the n-th packet (or the length of the n-th combined packet) into the descriptor 1020, 1020*a* and rewrites the reception completion flag WF #n, which indicates that the writing of the n-th packet (or combined packet) has been completed, set in the descriptor 1020, 1020*a* from "not completed" to "completed" (step S105 in FIG. 19).

As described above, while there are N (sets of) areas of the valid flags AF #1 to AF #N in the descriptor 1020, 1020*a*, the sequence in which the valid flags AF #1 to AF #N are checked is determined in advance. For example, in the examples illustrated in FIGS. 18 and 19, the DMA controller 1021, 1021*a* checks the valid flags in a sequence of the first valid flag AF #1, the second valid flag AF #2, . . . , the N-th valid flag AF #N. After the checking is completed once, the valid flags are checked in a sequence from the first valid flag AF #1 again.

In the descriptor 1020, 1020*a*, N sets of areas in which received data sizes L #1 to L #N and reception completion flags WF #1 to WF #N are written are also prepared. The DMA controller 1021, 1021*a* writes the received data size L #n and the reception completion flag WF #n into an area of a number corresponding to the n-th valid flag AF #n from which the n-th start address A #n has been checked to be "valid".

Next, the processor of the packet processing apparatus periodically checks the reception completion flag WF #n of the descriptor 1020, 1020*a* and, when the reception completion flag WF #n indicates "completed", reads the n-th packet (or combined packet) from the packet memory 101 using the information of the corresponding n-th start address A #n and the information of the corresponding n-th received data size L #n and performs a necessary process (for example, protocol process).

Then, the processor rewrites the n-th valid flag AF #n of the descriptor 1020, 1020*a*, which corresponds to the n-th packet (or combined packet) of which processing has been completed, from "valid" to "invalid" and rewrites the n-th reception completion flag WF #n of the descriptor 1020, 1020*a* from "completed" to "not completed".

In the descriptor 1020, 1020*a*, while there are N (sets of) areas of reception completion flags WF #1 to WF #N, a sequence in which the reception completion flags WF #1 to WF #N are checked is determined in advance. For example, in the example illustrated in FIGS. 18 and 19, the processor checks the reception completion flags in a sequence of a first reception completion flag WF #1, a second reception completion flag WF #2, . . . , an N-th reception completion flag WF #N. After the checking is completed once, the reception completion flags are checked in a sequence from the first reception completion flag WF #1 again.

Alternatively, the DMA controller 1021, 1021*a* makes an interruption processing request for the processor after completion of DMA transfer and instead of the processor periodically checking the reception completion flags WF #1 to WF #N in the operations described above, the processor may be configured to check the reception completion flags WF #1 to WF #N when an interruption processing request is received from the DMA controller 1021, 1021*a*.

Figure 3:
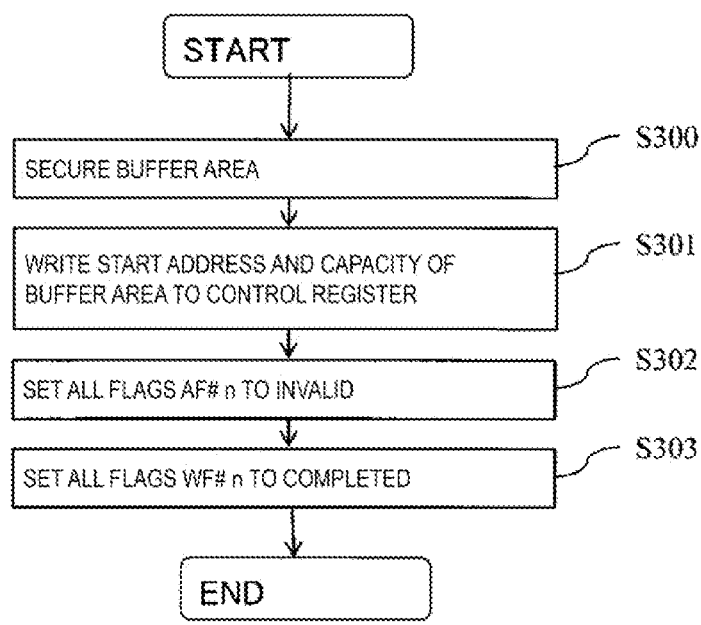
FIG. 3 is a flowchart illustrating operations of a transfer management unit of a packet processing apparatus according to the first embodiment of the present disclosure.

Next, an example of operations according to the present embodiment using the descriptor 1110 having the configuration illustrated in FIG. 2 will be described with reference to FIGS. 1 to 9. FIG. 3 is a flowchart illustrating operations of the transfer management unit 112, FIGS. 4 to 7 and 9 are flowcharts illustrating operations of the DMA controller 1111, and FIG. 8 is a flowchart illustrating operations of the reception processing unit 103.

First, the transfer management unit 112 (software executed by the processor) secures a continuous area as a buffer area for the combined packets in the packet memory 101 as an initial setting for the packet processing apparatus (step S300 in FIG. 3), and writes the start address A0 of the buffer area and information indicating the capacity (size) C0 into the control register 113 (step S301 in FIG. 3). The control register 113 is provided, for example, in a processor.

Note that a plurality of control registers 113 may be provided, although there is no problem with only one (set). When a plurality of control registers 113 are provided, the order used to write the packet is predetermined. In addition, the setting of the control register 113 is performed at the time of initial setting, and the setting change during operation is not performed.

Next, as an initial setting of the descriptor 1110, the transfer management unit 112 sets all the valid flags AF #n indicating whether the start address A #n (n is 1 to N) is valid or not to "invalid" (step S302 in FIG. 3), and sets all the reception completion flags WF #n indicating the completion of the reading of the packets from the packet memory 101 to "completed" (step S303 in FIG. 3).

Figure 4:
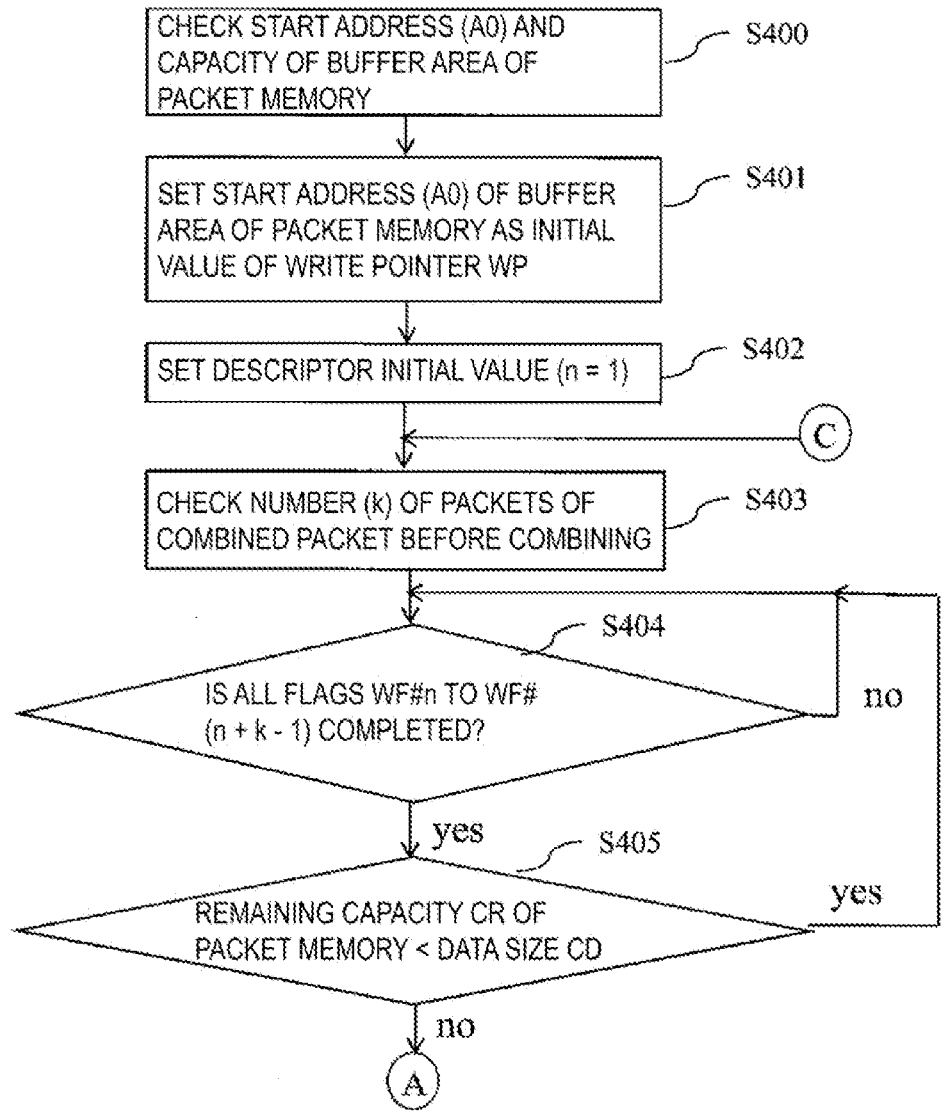
FIG. 4 is a flowchart illustrating operations of a DMA controller of a packet processing apparatus according to the first embodiment of the present disclosure.

When a transfer request is issued from the packet combining unit 110, in the case of the first transfer request after the initial setting described above, the DMA controller 1111 in the combined packet transferring unit 111 reads the start address A0 and the capacity (size) C0 set by the transfer management unit 112 from the control register 113 (step S400 in FIG. 4). Then, the DMA controller 1111 sets the start address A0 read in step S400 as the initial value of the write pointer WP for use in transferring packets to the packet memory 101 (step S401 in FIG. 4). In other words, in the present embodiment, the range of the address of the writable buffer area in the packet memory 101 is calculated from the setting of the control register 113, and the writable buffer area is used as a ring buffer.

Subsequently, the DMA controller 1111 initializes a variable n, which indicates the sequence of reading and writing of the descriptor 1110, to "1" (step S402 in FIG. 4).

The DMA controller 1111 checks information from the packet combining unit 110, checks whether data to be transferred to the packet memory 101 is separate packets which are not combined or a combined packet, and checks the number k of combined packets (step S403 in FIG. 4). As described above, the number of packets k which are combined is included in the information notified from the packet combining unit 110 (k=1 if not combined). Then, the DMA controller 1111 checks the k reception completion flags WF #n to WF #(n+k−1) in the descriptor 1110 (step S404 in FIG. 4).

In addition, in the case of n=N, the DMA controller 1111 may check the reception completion flags WF #N and WF #1 to WF #(k−1). When n<N, and n+k−1>N, the DMA controller 1111 may check the reception completion flags WF #n to WF #N and WF #1 to WF #(k−1−(N−n)).

When all the k reception completion flags checked by the process of step S404 are "completed" (yes in step S404), the DMA controller 1111 compares the remaining capacity CR of the buffer area for the combined packets in the packet memory 101 to the size CD of the data to be transferred to the packet memory 101 (step S405 in FIG. 4). When the data to be transferred to packet memory 101 is separate packets which are not combined, the size of the separate packet is compared to the remaining capacity CR; and when the data to be transferred to the packet memory 101 is a combined packet, the size of the combined packet is compared to the remaining capacity CR. As described above, the size CD of the data to be transferred to the packet memory 101 is notified from the packet combining unit 110.

Upon this comparison, the DMA controller 1111 calculates the remaining capacity CR of the buffer area for the combined packets in the packet memory 101, based on the write pointer WP and the read pointer RP. Specifically, in the case of the initial state (write pointer WP=read pointer RP), the DMA controller 1111 sets the value of the capacity (size) C0 read out from the control register 113 in step S400 as it is to the remaining capacity CR.

Further, in the case of the write pointer WP>the read pointer RP, the DMA controller 1111 sets C0−WP+RP to the remaining capacity CR; and in the case of the write pointer WP<the read pointer RP, the DMA controller 1111 sets RP−WP to the remaining capacity CR. Further, except for the initial state, in the case of the write pointer WP=the read pointer RP, the DMA controller 1111 sets 0 or C0 to the remaining capacity CR. Specifically, when the state transitions from the state of the write pointer WP>the read pointer RP to the state of the write pointer WP=the read pointer RP, it is determined that the read pointer is updated, the remaining capacity CR is set to C0; and when the state transitions from the state of the write pointer WP<the read pointer RP to the state of the write pointer WP=the read pointer RP, it is determined that the write pointer is updated, the remaining capacity CR is set to 0.

As described above, in the descriptor 1110, while N (sets of) areas of reception completion flags WF #1 to WF #N are prepared, a sequence in which the reception completion flags WF #1 to WF #N are checked is determined in advance. For example, in the example illustrated in FIGS. 2 and 4, the DMA controller 1111 checks the reception completion flags in a sequence of a n-th reception completion flag WF #n, a (n+1)-th reception completion flag WF #(n+1), . . . , an N-th reception completion flag WF #N (step S404). After checking the N-th reception completion flag WF #N, when checking of the k sets has not been ended, the reception completion flags are checked sequentially from the first reception completion flag WF #1.

When the remaining capacity CR of the buffer area for the combined packets in the packet memory 101 is smaller than the size CD of the data to be transferred to the packet memory 101 (yes in step S405), the DMA controller 1111 returns to step S404. The state in which the remaining capacity CR of the buffer area is smaller than the data size CD is resolved, if the remaining capacity CR of the buffer area is restored by reading the packets from the packet memory 101 by the software.

Figure 5:
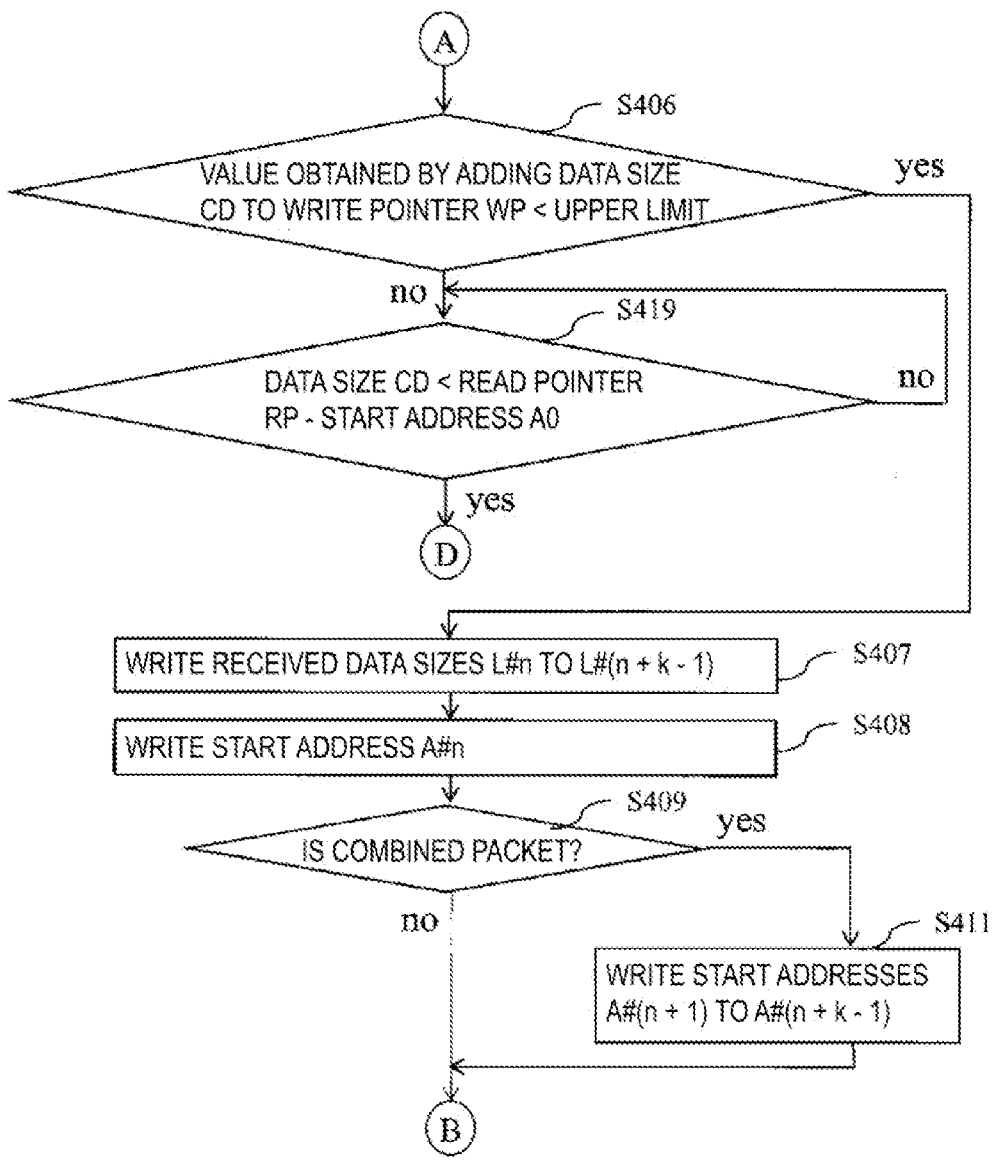
FIG. 5 is a flowchart illustrating operations of the DMA controller of the packet processing apparatus according to the first embodiment of the present disclosure.

Further, when the remaining capacity CR of the buffer area is greater than or equal to the size CD of the data to be transferred to the packet memory 101 (no in step S405), the DMA controller 1111 compares a value (WP+CD) obtained by adding the size CD of the data to be transferred to the packet memory 101 to the write pointer WP with a predetermined upper limit (step S406 in FIG. 5). Here, the upper limit is a value (A0+C0) obtained by adding the capacity C0 of the buffer area to the start address A0 of the buffer area in the packet memory 101.

When the value (WP+CD) obtained by adding the size CD of the data to the write pointer WP is smaller than the upper limit value (A0+C0) (yes in step S406), the DMA controller 1111 writes into the descriptor 1110, received data sizes L #n to L #(n+k−1) indicating packet lengths of k packets configuring the data to be transferred to the packet memory 101, based on the information (the size of each of packets that have been combined) notified from the packet combining unit 110 (step S407 in FIG. 5).

Subsequently, the DMA controller 1111 writes the value of the write pointer WP to the descriptor 1110, as the value of the n-th start address A #n (step S408 in FIG. 5). Further, when the data to be transferred to the packet memory 101 is separate packets which are not combined (k=1) (no in step S409 in FIG. 5), the DMA controller 1111 transitions to step S412 in FIG. 5.

Further, when the data to be transferred to the packet memory 101 is a combined packet (yes in step S409), the DMA controller 1111 writes (k−1) start addresses A #(n+1) to A #(n+k−1) inside the descriptor 1110 in accordance with packet lengths of the first (k−1) packets among k packets configuring the combined packet (step S411 in FIG. 5).

More specifically, the DMA controller 1111 writes the start address A #(n+1) to a value obtained by adding the start address A #n and the packet length of the first packet (a value indicated by the received data size L #n) among k packets configuring the combined packet. In addition, the DMA controller 1111 writes a start address A #(n+k−1) to a value obtained by adding the start address A #(n+k−2) and the packet length of the (k−1)-th packet (a value indicated by the received data size L #(n+k−2)) among k packets configuring the combined packet.

In this way, when a start address A #i is to be written, the DMA controller 1111 may write the start address A #i to a value obtained by adding a previous start address A #(i−1) and the packet length of an (i−1)-th packet among the packets configuring the combined packet.

Further, in the case of n=N, the DMA controller 1111 may write a received data size L #n and received data sizes L #1 to L #(k−1) into the descriptor 1110, and write the start address A #n and the start addresses A #1 to A #(k−1) into the descriptor 1110. In a case of n<N and n+k−1>N, the DMA controller 1111 may write a received data size L #n and received data sizes L #(n+1) to L #N and L #1 to L #(k−1−(N−n)) into the descriptor 1110, and write the start address A #n, and the start addresses A #(n+1) to A #N and A #1 to A #(k−1−(N−n)) into the descriptor 1110.

Figure 6:
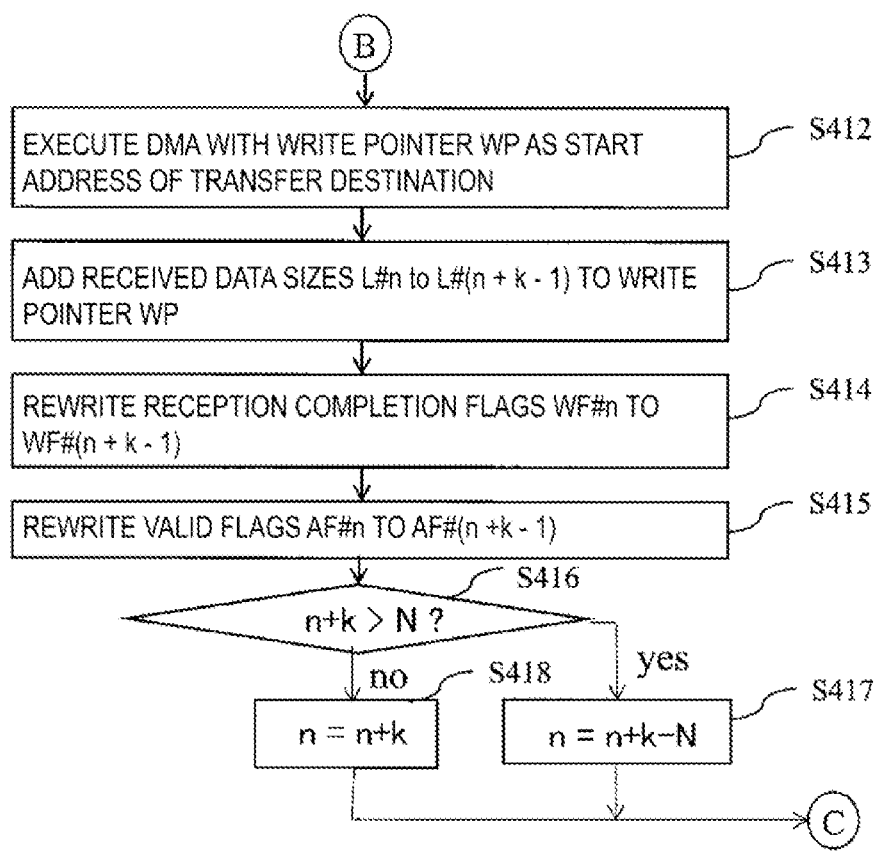
FIG. 6 is a flowchart illustrating operations of the DMA controller of the packet processing apparatus according to the first embodiment of the present disclosure.

Next, the DMA controller 1111 uses the write pointer WP as the start address of the transfer destination of the packet memory 101 and performs DMA transfer to write data (separate packets or combined packet) to be transferred to the packet memory 101 into the buffer area starting from the start address of the transfer destination of the packet memory 101 (step S412 in FIG. 6). That is, when the value (A0+C0) obtained by adding the capacity C0 of the buffer area to the start address A0 of the buffer area in the packet memory 101 is greater than the value (WP+CD) obtained by adding the size CD of the data to the write pointer WP, the DMA transfer is performed with the write pointer WP as the start address of the transfer destination.

Then, the DMA controller 1111 adds the size of the data (separate packets or combined packet) DMA-transferred to the packet memory 101 to the write pointer WP (step S413 in FIG. 6). Specifically, when the data which has been DMA-transferred to the packet memory 101 is separate packets which are not combined (k=1), the DMA controller 1111 adds the packet length of the packet (the value indicated by the received data size L #n) to the write pointer WP. Further, when the data to be transferred to the packet memory 101 is combined packets, the DMA controller 1111 adds the received data sizes L #n to L #(n+k−1) to the write pointer WP.

In addition, in the case of n=N, the DMA controller 1111 may add the received data size L #n and received data sizes L #1 to L #(k−1) to the write pointer WP. When n<N and n+k−1>N, the DMA controller 1111 may add the received data size L #n and received data sizes L #(n+1) to L #N and L #1 to L #(k−1−(N−n)) to the write pointer WP.

Next, the DMA controller 1111 rewrites reception completion flags WF #n to WF #(n+k−1) corresponding to the packets configuring the data DMA-transferred to the packet memory 101 from "completed" to "not completed" (step S414 in FIG. 6). Further, the DMA controller 1111 rewrites the valid flags AF #n to AF #(n+k−1) corresponding to packets configuring the data DMA-transferred to the packet memory 101 from "invalid" to "valid" (step S415 in FIG. 6).

Note that in the case of n=N, the DMA controller 1111 may rewrite the reception completion flag WF #n and the reception completion flags WF #1 to WF #(k−1) from "completed" to "not completed", and rewrite the valid flag AF #n and the valid flags AF #1 to AF #(k−1) from "invalid" to "valid". Further, when n<N and n+k−1>N, the DMA controller 1111 may rewrite the reception completion flag WF #n, the reception completion flags WF #(n+1) to WF #N and WF #1 to WF #(k−1−(N−n)) to "not completed", and rewrite the valid flag AF #n and the valid flags AF #(n+1) to AF #N and AF #1 to AF #(k−1−(N−n)) to "valid".

Then, the DMA controller 1111 checks whether n+k>N is established (step S416 in FIG. 6), and when n+k is greater than N, the DMA controller 1111 sets the variable n to n=n+k−N (step S417 in FIG. 6), and returns to step S403. Further, when n+k is N or less, the DMA controller 1111 sets the variable n to n=n+k (step S418 in FIG. 6) and returns to step S403.

On the other hand, when a value (WP+CD) obtained by adding the write pointer WP to the size CD of the data to be transferred to the packet memory 101 is greater than or equal to the upper limit (A0+C0) (no in step S406), the DMA controller 1111 compares the size CD of the data to the value (RP−A0) obtained by subtracting the start address A0 of the buffer area in the packet memory 101 from the read pointer RP (step S419 in FIG. 5).

Figure 7:
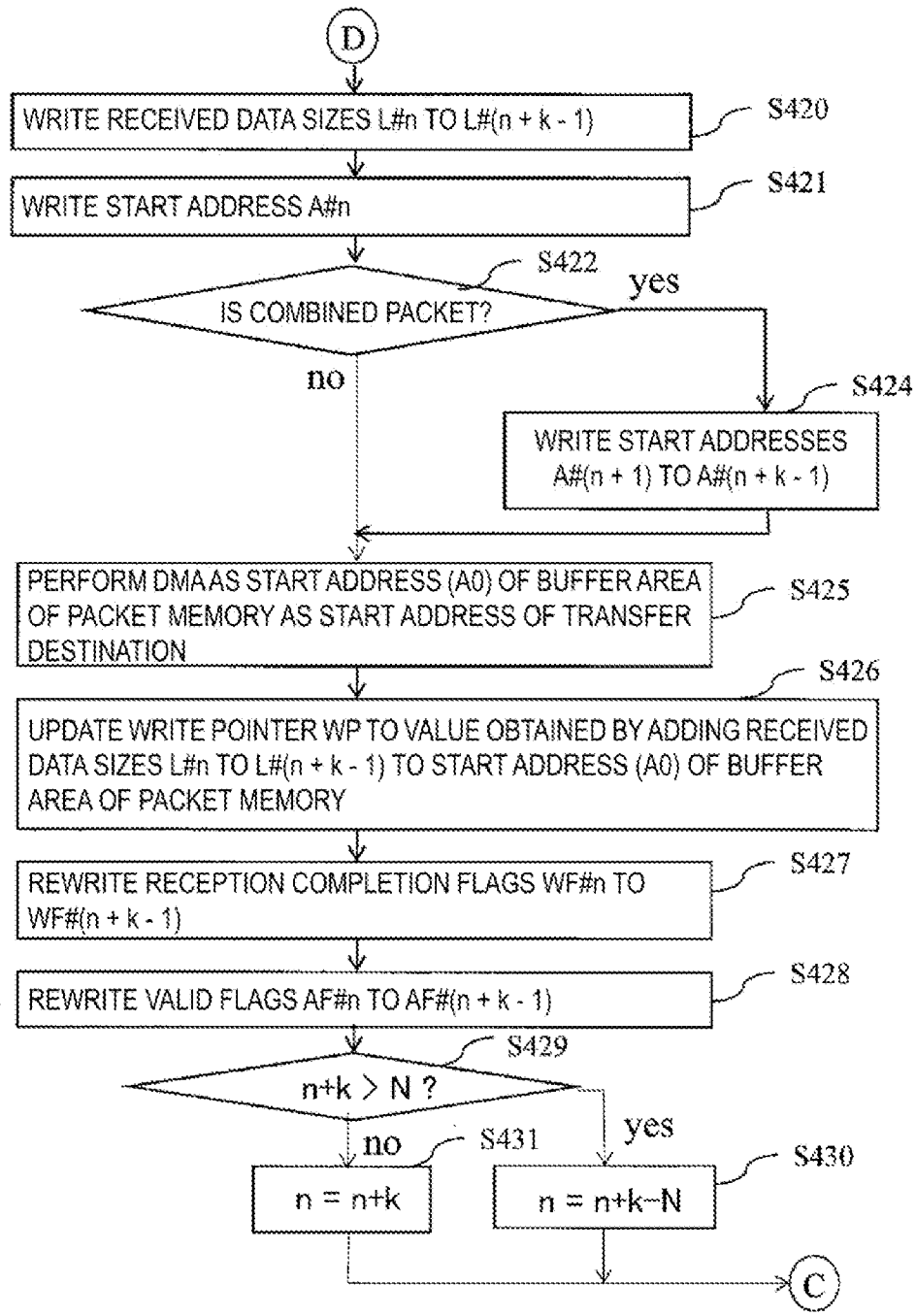
FIG. 7 is a flowchart illustrating operations of the DMA controller of the packet processing apparatus according to the first embodiment of the present disclosure.

When the size CD of the data is smaller than the subtraction value (RP−A0) (yes in step S419), the DMA controller 1111 writes into the descriptor 1110, received data sizes L #n to L #(n+k−1) indicating packet lengths of k packets configuring the data to be transferred to the packet memory 101, based on the information (the size of each of packets that have been combined) notified from the packet combining unit 110 (step S420 in FIG. 7).

Subsequently, the DMA controller 1111 writes the value of the start address A0 of the buffer area in the packet memory 101 to the descriptor 1110, as the value of the n-th start address A #n (step S421 in FIG. 7). Further, when the data to be transferred to the packet memory 101 is separate packets which are not combined (k=1) (no in step S422 in FIG. 7), the DMA controller 1111 transitions to step S425 in FIG. 7.

Further, when the data to be transferred to the packet memory 101 is a combined packet (yes in step S422), the DMA controller 1111 writes (k−1) start addresses A #(n+1) to A #(n+k−1) inside the descriptor 1110 in accordance with packet lengths of the first (k−1) packets among k packets configuring the combined packet (step S424 in FIG. 7).

More specifically, the DMA controller 1111 writes the start address A #(n+1) to a value obtained by adding the start address A #n and the packet length of the first packet (a value indicated by the received data size L #n) among k packets configuring the combined packet. In addition, the DMA controller 1111 writes a start address A #(n+k−1) to a value obtained by adding the start address A #(n+k−2) and the packet length of the (k−1)-th packet (a value indicated by the received data size L #(n+k−2)) among k packets configuring the combined packet. In this way, when a start address A #i is to be written, the DMA controller 1111 may write the start address A #i to a value obtained by adding a previous start address A #(i−1) and the packet length of an (i−1)-th packet among the packets configuring the combined packet.

Further, in the case of n=N, the DMA controller 1111 may write a received data size L #n and received data sizes L #1 to L #(k−1) into the descriptor 1110, and write the start address A #n and the start addresses A #1 to A #(k−1) into the descriptor 1110. In a case of n<N and n+k−1>N, the DMA controller 1111 may write a received data size L #n and received data sizes L #(n+1) to L #N and L #1 to L #(k−1−(N−n)) into the descriptor 1110, and write the start address A #n, and the start addresses A #(n+1) to A #N and A #1 to A #(k−1−(N−n)) into the descriptor 1110.

Next, the DMA controller 1111 performs DMA transfer to write data (separate packets or combined packet) to be transferred to the packet memory 101 into the buffer area starting from the start address A0 of the packet memory 101 (step S425 in FIG. 7). That is, when the "A0+C0−WP" is less than the size CD of the data to be transferred to the packet memory 101 and the capacity of the buffer area from the start address A0 to the read pointer RP is greater than the size CD of the transfer data, DMA transfer is performed with the start address A0 of the packet memory 101 as the start address of the transfer destination, instead of the write pointer WP.

Then, the DMA controller 1111 updates the write pointer WP to a new value obtained by adding the size of the data (separate packets or combined packet) DMA-transferred to the packet memory 101 to the start address A0 of the buffer area of the packet memory 101 (step S426 in FIG. 7). Specifically, when the data which has been DMA-transferred to the packet memory 101 is separate packets which are not combined (k=1), the DMA controller 1111 sets a value obtained by adding the packet length of the packet (the value indicated by the received data size L #n) to the start address A0 as a new value of the write pointer WP. Further, when the data to be transferred to the packet memory 101 is combined packets, the DMA controller 1111 sets a value obtained by adding the received data sizes L #n to L #(n+k−1) to the start address A0 as a new value of the write pointer WP.

In addition, in the case of n=N, the DMA controller 1111 may set a value obtained by adding the received data size L #n and received data sizes L #1 to L #(k−1) to the start address A0 as a new value of the write pointer WP. When n<N and n+k−1>N, the DMA controller 1111 may set a value obtained by adding the received data size L #n and received data sizes L #(n+1) to L #N and L #1 to L #(k−1−(N−n)) to the start address A0 as a new value of the write pointer WP.

Next, the DMA controller 1111 rewrites reception completion flags WF #n to WF #(n+k−1) corresponding to the packets configuring the data DMA-transferred to the packet memory 101 from "completed" to "not completed" (step S427 in FIG. 7). Further, the DMA controller 1111 rewrites the valid flags AF #n to AF #(n+k−1) corresponding to packets configuring the data DMA-transferred to the packet memory 101 from "invalid" to "valid" (step S428 in FIG. 7).

Note that in the case of n=N, the DMA controller 1111 may rewrite the reception completion flag WF #n and the reception completion flags WF #1 to WF #(k−1) from "completed" to "not completed", and rewrite the valid flag AF #n and the valid flags AF #1 to AF #(k−1) from "invalid" to "valid". Further, when n<N and n+k−1>N, the DMA controller 1111 may rewrite the reception completion flag WF #n, the reception completion flags WF #(n+1) to WF #N and WF #1 to WF #(k−1−(N−n)) to "not completed", and rewrite the valid flag AF #n and the valid flags AF #(n+1) to AF #N and AF #1 to AF #(k−1−(N−n)) to "valid".

Then, the DMA controller 1111 checks whether n+k>N is established (step S429 in FIG. 7), and when n+k is greater than N, the DMA controller 1111 sets the variable n to n=n+k−N (step S430 in FIG. 7), and returns to step S403. Further, when n+k is N or less, the DMA controller 1111 sets the variable n to n=n+k (step S431 in FIG. 7) and returns to step S403.

Thus, in the DMA transfer of the present embodiment, the combined packet in which k packets are combined together are collectively transferred to the packet memory 101 and the information on the start address of the descriptor 1110 is written by the DMA controller 1111, so that the processor (the reception processing unit 103 and the protocol processing unit 104) of the packet processing apparatus is notified of the address in which the start of each packet is written.

Note that the DMA controller 1111 also performs an update process on the read pointer RP in response to the processes of the reception processing unit 103 to be described later (software executed by the processor), and the update process on the read pointer RP will be described later in detail.

Figure 8:
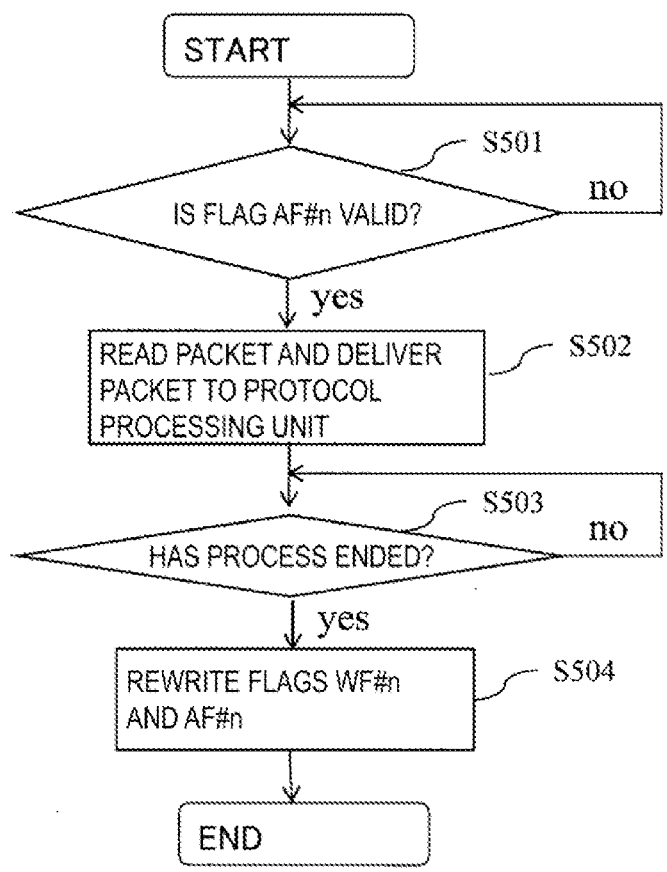
FIG. 8 is a flowchart illustrating operations of a reception processing unit of a packet processing apparatus according to the first embodiment of the present disclosure.

The reception processing unit 103 (software executed by the processor) periodically checks the valid flag AF #n (n is 1 to N) of the descriptor 1110, and when the valid flag AF #n indicates "valid" (yes in step S501 in FIG. 8), the reception processing unit 103 reads n-th packet from the packet memory 101, based on the information on the corresponding n-th start address A #n and the information on the corresponding n-th received data size L #n, and delivers the n-th packet to the protocol processing unit 104 (step S502 in FIG. 8).

After the protocol processing unit 104 has performed necessary processes (yes in step S503 in FIG. 8), the reception processing unit 103 (software executed by the processor) rewrites the n-th reception completion flag WF #n of the descriptor 1110, corresponding to the n-th packet on which the protocol process is ended, from "not completed" to "completed", and rewrites the n-th valid flag AF #n of the descriptor 1110 from "valid" to "invalid" (step S504 in FIG. 8).

While there are N (sets of) areas of the valid flags AF #1 to AF #N in the descriptor 1110, the sequence in which the valid flags AF #1 to AF #N are checked is determined in advance. For example, the reception processing unit 103 checks the valid flags in a sequence of the first valid flag AF #1, the second valid flag AF #2, . . . , and the N-th valid flag AF #N. After the checking is completed once, the valid flags are checked in a sequence from the first valid flag AF #1 again.

In addition, instead of periodically checking the valid flag AF #n of the descriptor 1110, the DMA controller 1111 may be configured to issue an interruption processing request for the processor after the completion of the DMA transfer, and the reception processing unit 103 (software executed by the processor) may be configured to check the valid flag AF #n (here, n is 1 to N) of the descriptor 1110 in response to this interruption processing request.

Figure 17:
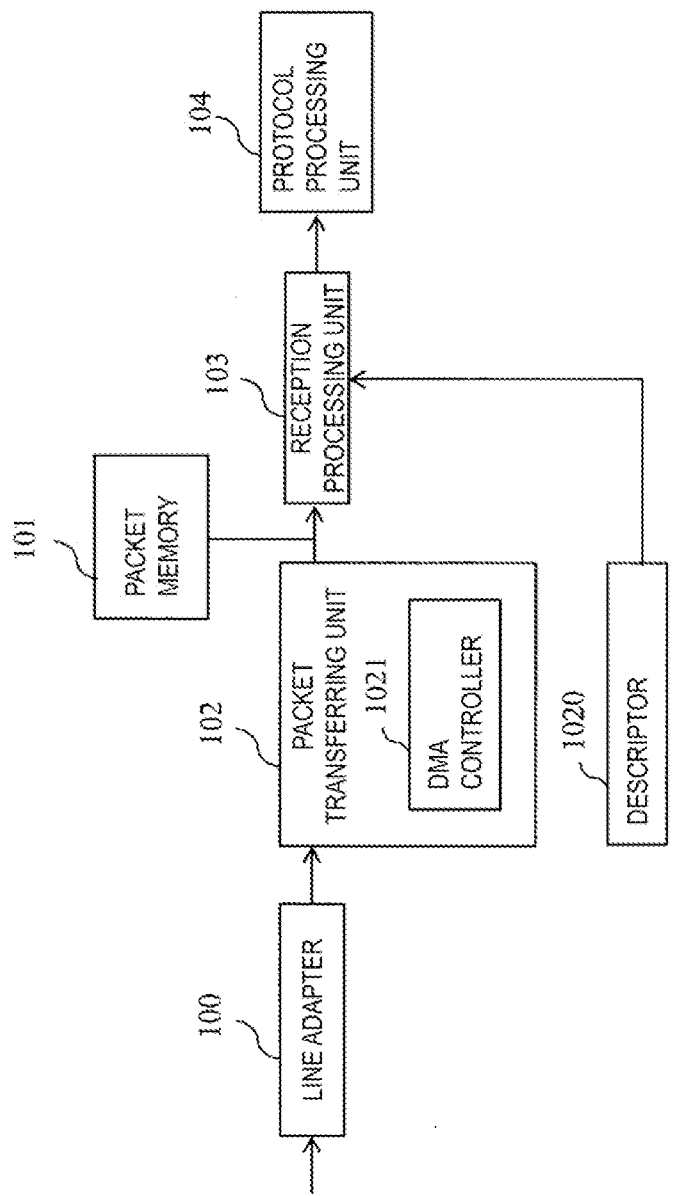
FIG. 17 is a block diagram illustrating a configuration of a packet processing apparatus in a related art.
Figure 18:
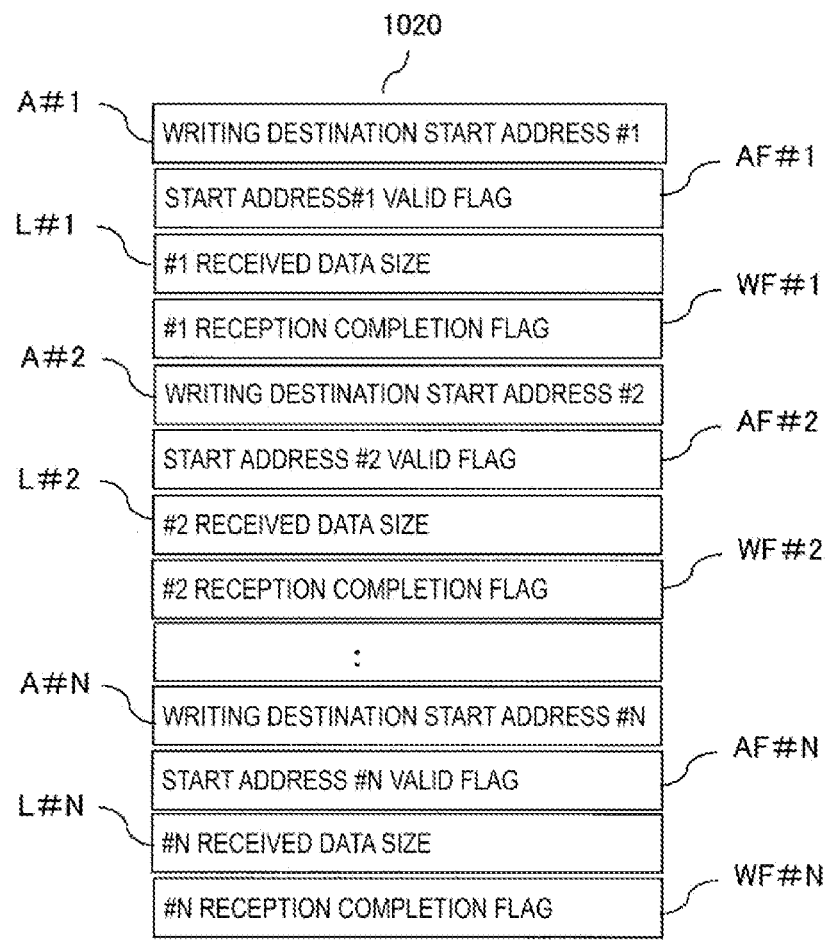
FIG. 18 is a diagram illustrating an overview of a descriptor of the packet processing apparatus illustrated in FIG. 17.

The operation of the processor (software) described above are equivalent to the operation of the processor (software) of the configuration of FIG. 17 in the related art, and it is not necessary to implement the process of restoring the combined packet to the plurality of original packets in software for reception processing. In other words, the reception processing unit 103 and the protocol processing unit 104 may perform the same processing as in the related art, even when the combined packet is written into the packet memory 101 as in the present embodiment.

Next, the update process of the read pointer RP by the DMA controller 1111 will be described. First, the DMA controller 1111 sets as the initial value of the read pointer RP, a start address A0 of the buffer area for the combined packet of the packet memory 101 (step S440 in FIG. 9). Further, the DMA controller 1111 initializes the variable n indicating the checking order of the valid flag to 1 (step S441 in FIG. 9). Note that the variable n and the variable n in FIGS. 4 to 7 are the same values, so that the process of step S441 is the same as the process of step S402.

Figure 9:
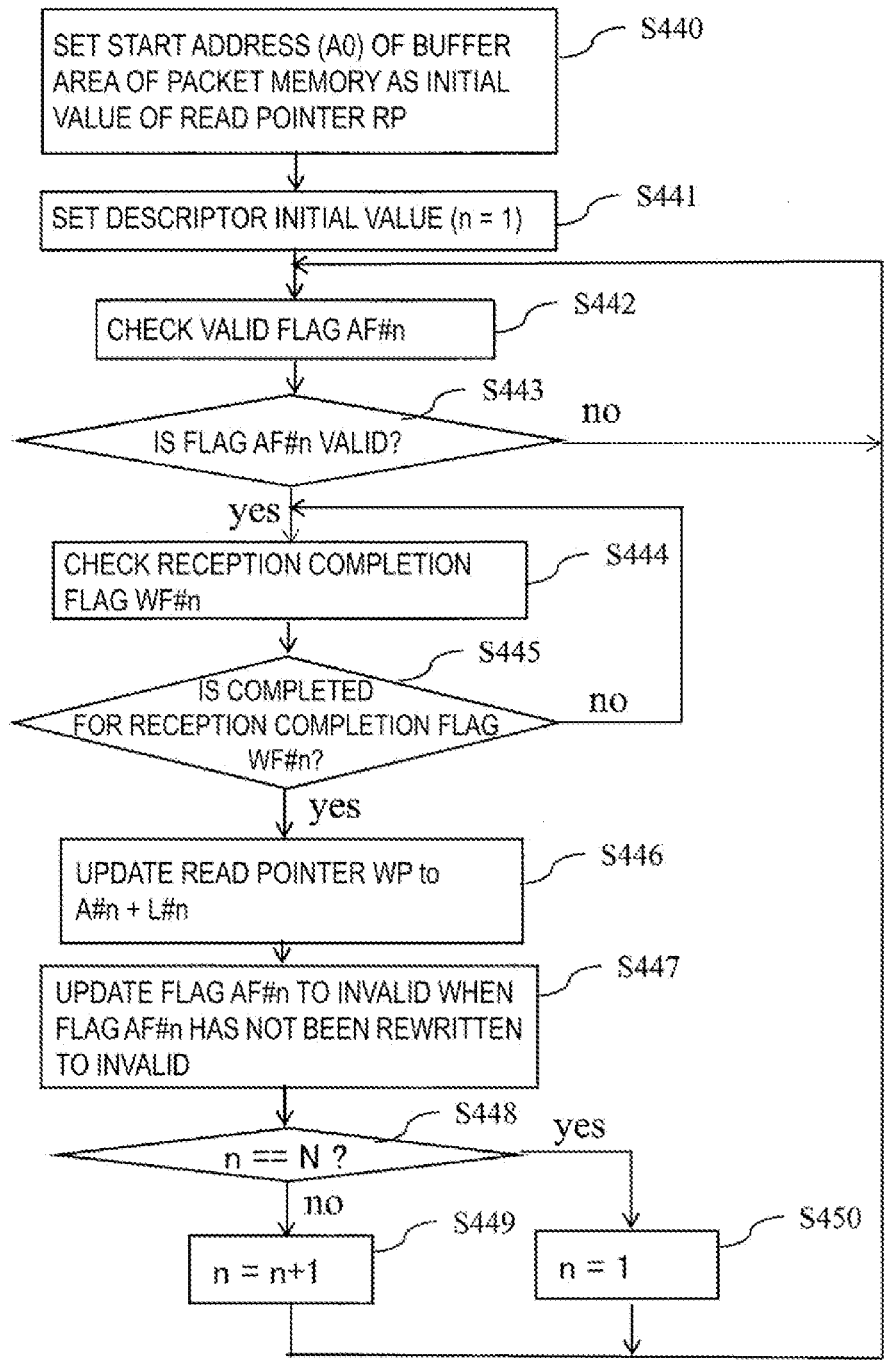
FIG. 9 is a flowchart illustrating operations of the DMA controller of the packet processing apparatus according to the first embodiment of the present disclosure.

The DMA controller 1111 periodically checks the n-th valid flag AF #n of the descriptor 1110 during the process of FIGS. 4 to 7 (step S442 in FIG. 9). After the DMA controller 1111 has detected that the valid flag AF #n indicates that the n-th start address A #n is "valid" (yes in step S443 in FIG. 9), the DMA controller 1111 checks the n-th reception completion flag WF #n of the descriptor 1110 corresponding to the n-th start address A #n (step S444 in FIG. 9).

When the n-th reception completion flag WF #n of the descriptor 1110 indicates "completed" (yes in step S445 in FIG. 9), the DMA controller 1111 updates the read pointer RP to a new value obtained by adding the n-th received data size L #n to the n-th start address A #n (step S446 in FIG. 9).

When the valid flag AF #n is not rewritten to "invalid" by software executed by the processor, the DMA controller 1111 updates the valid flag AF #n to "invalid" (step S447 in FIG. 9).

The DMA controller 1111 determines whether the variable n is equal to N (step S448 in FIG. 9). When the variable n has not reached N (No in step S448), the DMA controller 1111 increases the variable n by "1" (step S449 in FIG. 9) and returns the process to step S442. When the variable n reaches N (yes in step S448), the DMA controller 1111 sets the variable n to 1 (step S450 in FIG. 9), and returns to step S442.

Note that the reception completion flag WF #n becomes "completed" due to the operation of the reception processing unit 103 in FIG. 8.

Further, the read pointer RP described above is used for the DMA controller 1111 to calculate the remaining capacity of the buffer area for the combined packet in the packet memory 101, or the like, and is not intended to be used in read by software or the like.

As explained above, the packet processing apparatus according to the present embodiment includes a combined packet transferring unit 11 which is capable of implementing the collective DMA transfer and incorporates a unit (DMA controller 1111) for writing into the descriptor 1110, information for restoring the combined packet to the plurality of original packets. The DMA controller 1111 can be implemented by hardware, and thus a restoration process using software does not need to be executed, and high reception performance according to effects of the collective DMA transfer can be implemented.

Figure 23:
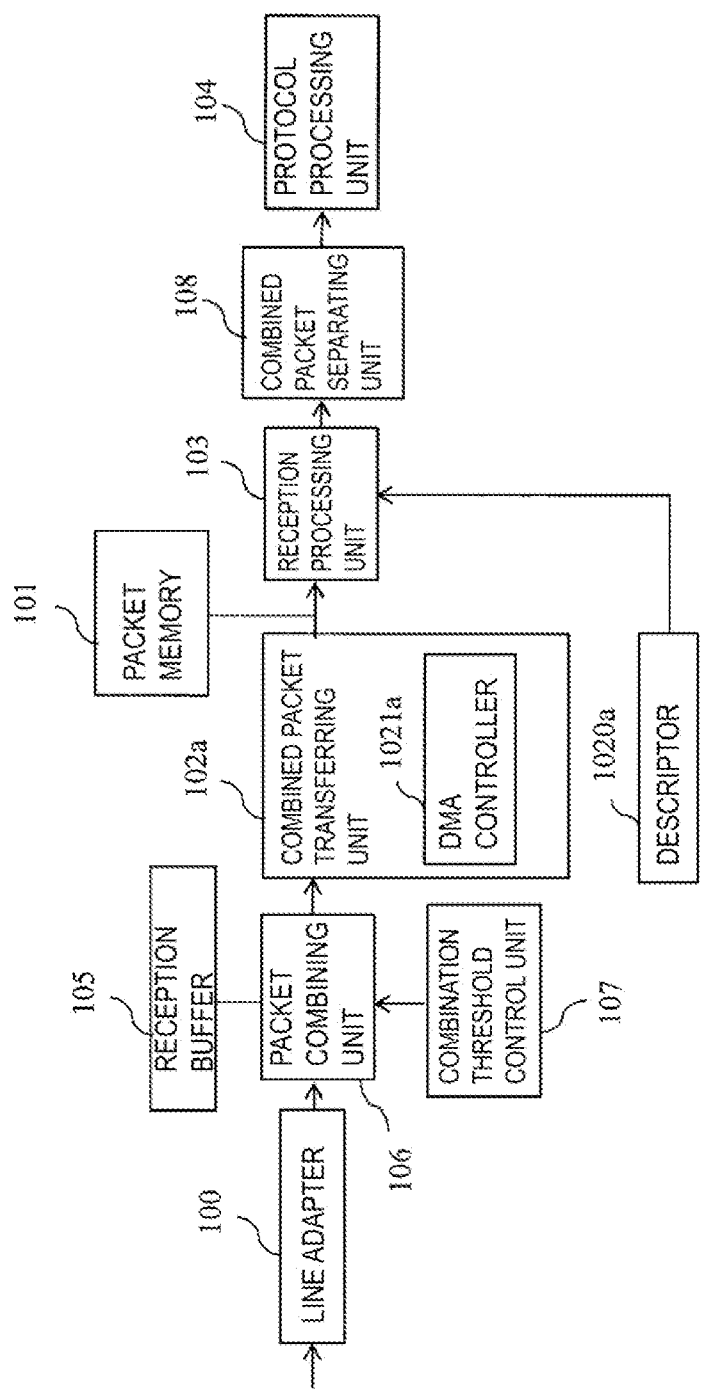
FIG. 23 is a block diagram illustrating another configuration of the packet processing apparatus in the related art.

In the packet processing apparatus having the configuration of FIG. 20 or the configuration of FIG. 23 of the related art, in comparison with the case where the process of restoring the combined packet into the plurality of original packets is executed by the processor (software), in the present embodiment, it is not necessary to perform the restoration process by the processor (software), so that there is an effect that the process by the processor required for processing one packet is lightened and the reception performance is improved (the number of packets that can be processed per unit time is increased). In addition, in the present embodiment, there is also an effect of decreasing the power consumption of the processor that is required for processing one packet.

In addition, in the configuration of FIG. 20 or the configuration of FIG. 23 in the related art, in order to successfully perform the collective DMA transfer, it is necessary to secure a buffer area of N×DB_mux (DB_mux is the maximum size of the combined packet) in the packet memory 101 in advance by software. In contrast, in the packet processing apparatus of the present embodiment, the collective DMA transfer can be performed successfully in a smaller buffer area.

The maximum size DB_mux of the combined packet is a value obtained by adding the maximum allowable packet length to the threshold set in the combination threshold control unit 107. Thus, for example, assuming that the threshold is 500 bytes, the maximum allowable packet length is 2000 bytes, and N is 10, the size of the buffer area that needs to be secured in the packet memory 101 in the configuration of FIG. 20 or the configuration of FIG. 23 in the related art is 10×2500=25000 bytes.

The size of the buffer area that needs to be secured in the packet memory 101 by the packet processing apparatus of the present embodiment is not dependent on N, but is the maximum size DB_mux of the combined packet. In other words, the size of the buffer area that needs to be secured in the packet memory 101 by the packet processing apparatus of the present embodiment is 2500 bytes under the same conditions described above. In such a manner, the size of the buffer area can be reduced by mounting a function (step S405 in FIG. 4 and step S419 in FIG. 5) for making DMA transfer wait until the remaining capacity CR of the buffer area is a required amount when the remaining capacity CR of the buffer area is small.

Thus, in the present embodiment, the smaller the size of the buffer area to be secured in the packet memory 101, the higher the probability that the next DMA transfer is awaiting until the read of the packet from the packet memory 101 by the software is completed.

Here, the amount of wasted area is compared when the size of the buffer area that is secured in the packet memory 101 in the packet processing apparatus of the present embodiment is made the same as the size required in the configuration of FIG. 20 or the configuration of FIG. 23 in the related art.

When the threshold is 500 bytes, the maximum allowable packet length is 2000 bytes, and N is 10 as described above, the size of the combined packets actually transferred to the packet memory 101 is 501 bytes to 2500 bytes. That is, in the configuration of FIG. 20 or the configuration illustrated in FIG. 23 in the related art, when the size of each of the combined packets is S, an area obtained by adding (2500−S) for 10 combined packets is wasted. This indicates that the area of 10000 bytes out of 25000 bytes is wasted, assuming that the average of the size S of the combined packets is 1500 bytes.

When 25000 bytes is a size of a buffer area that is secured in the packet memory 101 in the configuration of the present embodiment, 25000 bytes is secured in a continuous area, and a plurality of combined packets can be written to the continuous area. Thus, only the value obtained by subtracting 1 byte from the maximum size 2500 bytes of the combined packet, that is, 2499 bytes, is wasted in the present embodiment. This value indicates that when the average of the sizes S of the combined packets is smaller than (25000−2499)/10=2250.1, if N is 11 or greater, then 11 or more combined packets are written into the buffer of the same capacity (25000 bytes). In the configuration of FIG. 20 or the configuration of FIG. 23 in the related art, N is 11 or higher and the buffer area of 27500 bytes or more is required in order to write 11 or more combined packets.

Thus, when the size of the buffer area that is secured in the packet memory 101 in the packet processing apparatus of the present embodiment is made the same as the size required in the configuration of FIG. 20 or the configuration of FIG. 23 in the related art, the area that is wasted is smaller than in the configuration of FIG. 20 or the configuration of FIG. 23 in the related art, and a larger number of combined packets may be written into the same size of buffer area.

Assuming that the average of the size S of the combined packets is at most 1500 bytes and the maximum number of combined packets to be written into the buffer area is 10, the size of the buffer area to be secured in the packet memory 101 in the packet processing apparatus of the present embodiment is 1500×10=15000 bytes, and is smaller than the size (25000 bytes) required in the configuration of FIG. 20 or in the configuration of FIG. 23 in the related art.

In the configuration of the present embodiment, it is possible to independently determine the maximum number of combined packets to be written into the buffer area of the packet memory 101 and N of the descriptor 1110. As described above, the size of the buffer area is determined by the maximum number of combined packets written into the buffer area, and N may be the maximum number of packets to be written into the buffer area. However, the maximum number of packets actually written into the buffer area depends on the size of the packet to be stored and the size of the buffer area, resulting in an N or smaller value. Assuming that the average of the size S of the combined packet is 1500 bytes, the average of the number k of combined packets is two, and the maximum number of combined packets to be written into the buffer area is 10, it is desirable that the size of the buffer area is 1500×10=15000 bytes and N is 2×10=20.

As in the related art, in order to implement the process of restoring a combined packet, in which a plurality of packets are combined, to the plurality of original packets by the reception processing unit 103, the protocol processing unit 104, or the hardware of the combined packet separating unit 108 illustrated in FIG. 23, a mechanism for the packet combining unit 106 to notify the reception processing unit 103 and the protocol processing unit 104 or the combined packet separating unit 108 illustrated in FIG. 23 of information (the number of packets of the combined packet and the size of each packet) required for the restoration process is required.

As in the related art, in order to implement the restoration process by hardware of the reception processing unit 103, the protocol processing unit 104, or the combined packet separating unit 108 illustrated in FIG. 23, it should be considered that information, which is required for the restoration process, corresponding to a plurality of combined packets needs to be stored depending on a situation until a reception process is activated after the completion of DMA transfer.

In contrast to this, in the packet processing apparatus according to the present embodiment, the restoration process for a combined packet is completed at a time point at which DMA transfer of one combined packet is completed, and thus, information corresponding to a plurality of combined packets does not need to be stored. Thus, the scale of the hardware according to the present embodiment is smaller than that of a case in which the restoration process is implemented by hardware of the reception processing unit 103, the protocol processing unit 104, or the combined packet separating unit 108 illustrated in FIG. 23.

Further, as in the related art, as a mechanism for the packet combining unit 106 to notify the reception processing unit 103, the protocol processing unit 104, or the combined packet separating unit 108 illustrated in FIG. 23 of information required for the restoration process, the information required for the restoration process may be written in the combined packet. However, when the information required for the restoration process is written in the combined packet, a part of the bandwidth of a bus used for the DMA transfer is occupied by the information required for the restoration process, so that an effective bandwidth that can be used for transferring the original packet data decreases, and, as a result, there arises a problem that the performance of the DMA transfer deteriorates.

In the packet processing apparatus according to the present embodiment, the information required for the restoration process does not need to be written into a combined packet, and thus, the degradation of the effective bandwidth as described above does not occur.

Although the example of implementing the combined packet transferring unit 11 in hardware has been illustrated in the present embodiment, it is also possible to implement at least a part of processes of the combined packet transferring unit 11 with a processor separate from the processor used for the reception process and software. Even when at least a part of processes of the combined packet transferring unit 111 is implemented in software in this manner, it is not necessary to perform the process of restoring the combined packet to the plurality of original packets by the reception processing unit 103 or the protocol processing unit 104, so that it is possible to achieve high reception performance due to the effect of the collective DMA transfer.

Further, even when at least a part of processes of the combined packet transferring unit 111 is implemented in software, similar to the case of the combined packet transferring unit 111 is implemented in hardware, it is also possible to achieve the effect of reducing the scale of the hardware required for the process of restoring the combined packet to the plurality of original packets (effects due to the fact that the information on the plurality of combined packets does not need to be held) and the effect that the degradation of the effective bandwidth that can be used to transfer the packet data does not occur (the effect of not adding the information required for the restoration process into the combined packet).

As a modification of the present embodiment, a plurality of DMA controllers 1111 and a plurality of descriptors 1110 corresponding to the DMA controllers 1111 may be configured to be mounted. In addition, the packet combining unit 110 may be configured to determine a type of packet and collect packets of the same type as a combined packet or may be configured to selectively use the plurality of DMA controllers 1111 and the plurality of descriptors 1110 in a divisional manner in accordance with a type of packet.

When a configuration in which a DMA controller 1111 and a descriptor 1110 are prepared for each type of packet, and a plurality of DMA controllers 1111 and a plurality of descriptors 1110 are selectively used in a divisional manner in accordance with a type of packet is employed, a different reception process may be easily performed for each type of packet.

In addition, in the present embodiment, a configuration in which a plurality of DMA controllers 1111 and a plurality of descriptors 1110 are selectively used in a divisional manner for each core of the processor in which a plurality of CPU cores are built may be employed, or a configuration in which a plurality of DMA controllers 1111 and a plurality of descriptors 1110 are used in a divisional manner for each virtual machine may be employed.

By employing the configuration in which the plurality of DMA controllers 1111 and the plurality of descriptors 1110 are selectively used in a divisional manner for each CPU core or for each virtual machine, the performance of the reception process implemented by software can be improved compared to a case in which there is only one DMA controller or the like.

Note that, when an unwritable address is set by the control register 113 or the like as a writable address in the packet memory 101, when the capacity from the write pointer WP at that time to the unwritable address is smaller than the size CD of transfer data (uncombined packet or combined packet), the value of the write pointer WP may be jumped to an address area having a capacity larger than the size CD of transfer data and used for writing.

Second Embodiment

Next, a second embodiment of the present disclosure will be described. The first embodiment has been described on the assumption that the DMA transfer is used, but even in a packet processing apparatus that does not use DMA transfer, effective throughput of writing into packet memory may increase by writing a combined packet in which a plurality of packets are combined to the packet memory collectively (for example, a case where the packet memory is configured by a Dynamic Random Access Memory (DRAM)).

Figure 10:
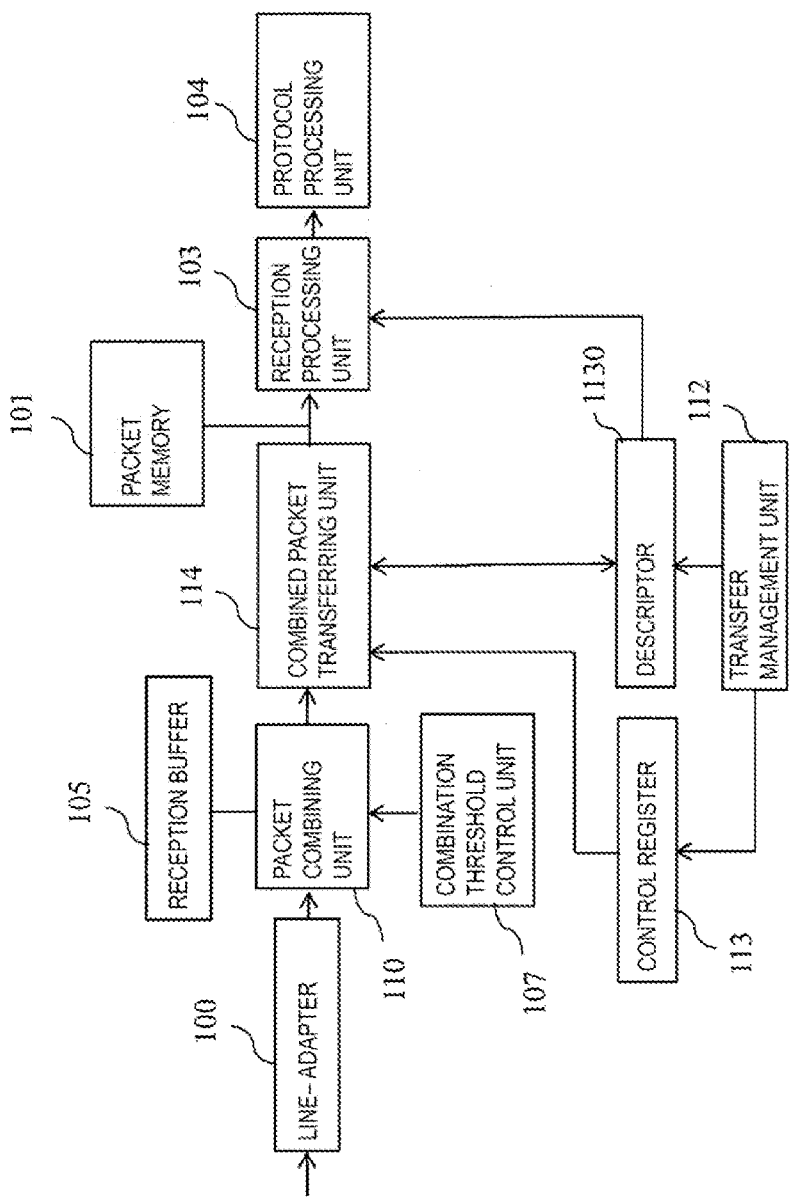
FIG. 10 is a block diagram illustrating a configuration of a packet processing apparatus according to a second embodiment of the present disclosure.

FIG. 10 is a block diagram illustrating a configuration of a packet processing apparatus according to a second embodiment of the present disclosure. This packet processing apparatus in FIG. 10 includes a line adapter 100, a packet memory 101, a reception processing unit 103, a protocol processing unit 104, a reception buffer 105, a combination threshold control unit 107, a packet combining unit 110, a transfer management unit 112, a combined packet transferring unit 114, a control register 113, and a descriptor 1130.

The difference between the configuration of FIG. 10 and the configuration of FIG. 1 is that the transfer unit in FIG. 1 is replaced with a writing unit by a processor (software) of the packet processing apparatus. That is, in the present embodiment, the combined packet transferring unit 111 of FIG. 1 is replaced with a software combined packet transferring unit 114.

The line adapter 100, the packet memory 101, the reception processing unit 103, the protocol processing unit 104, the reception buffer 105, the combination threshold control unit 107, the transfer management unit 112, and the control register 113 are equivalent to the configuration illustrated in FIG. 1.

The packet combining unit 110 in FIG. 10 transfers packets received by the line adapter 100 to the reception buffer 105 for combining packets. At this time, the packet combining unit 110 stores the packet in the reception buffer 105 so as to combine the packet received by the line adapter 100 and packets already stored in the reception buffer 105 to become one combined packet. When the size of the combined packet in the reception buffer 105 exceeds the threshold set in the combination threshold control unit 107, the packet combining unit 110 issues a transfer request for the combined packet to the packet memory 101.

The packet combining unit 110 may be configured to issue a transfer request when a timeout has occurred (when an interval between packets exceeds a period set in advance or the like) before the size of the combined packet in the reception buffer 105 exceeds the threshold.

In addition, the packet combining unit 110 records the number of packets combined in the reception buffer 105 and the size of each packet and notifies the combined packet transferring unit 114 of information on the number of packets of the combined packet and the size of each packet when issuing a transfer request for a combined packet.

The combined packet transferring unit 114 (software executed by the processor) writes the combined packet in which the plurality of packets are combined into the packet memory 101 and makes an activation request for the reception processing unit 103. In addition, the combined packet transferring unit 114 writes information on the size or the like into the descriptor 1130 that is prepared for each packet, by using the information of the number of packets of the combined packet and the size of each packet notified of by the packet combining unit 110.

Figure 11:
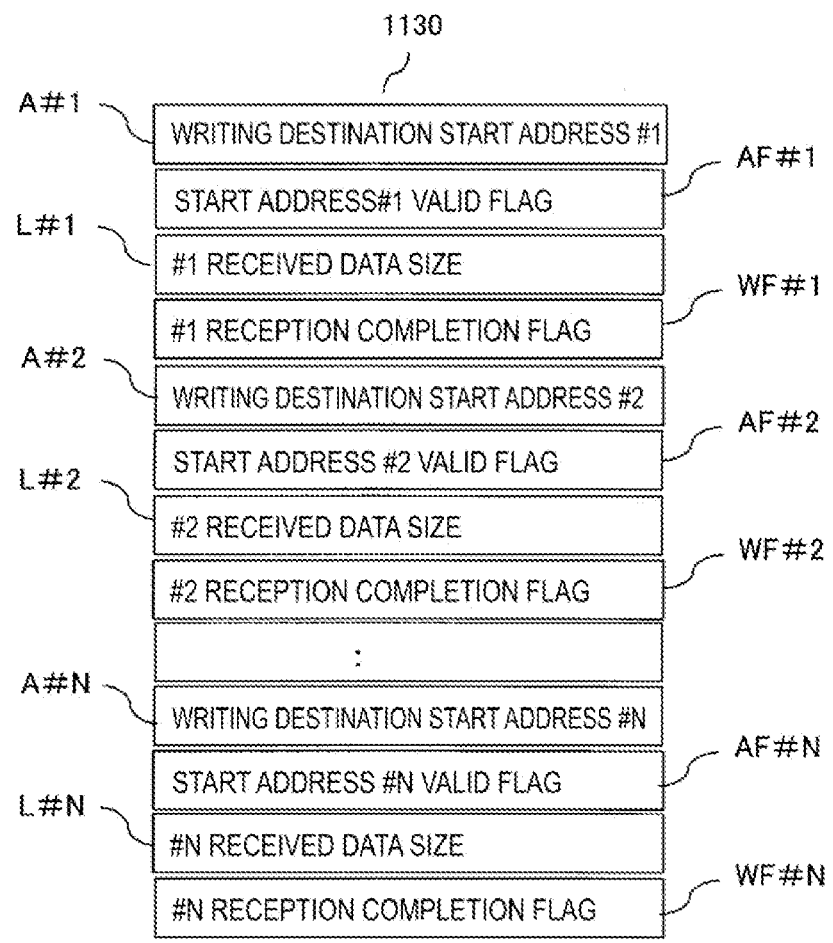
FIG. 11 is a diagram illustrating an overview of a descriptor of a packet processing apparatus according to the second embodiment of the present disclosure.
Figure 12:
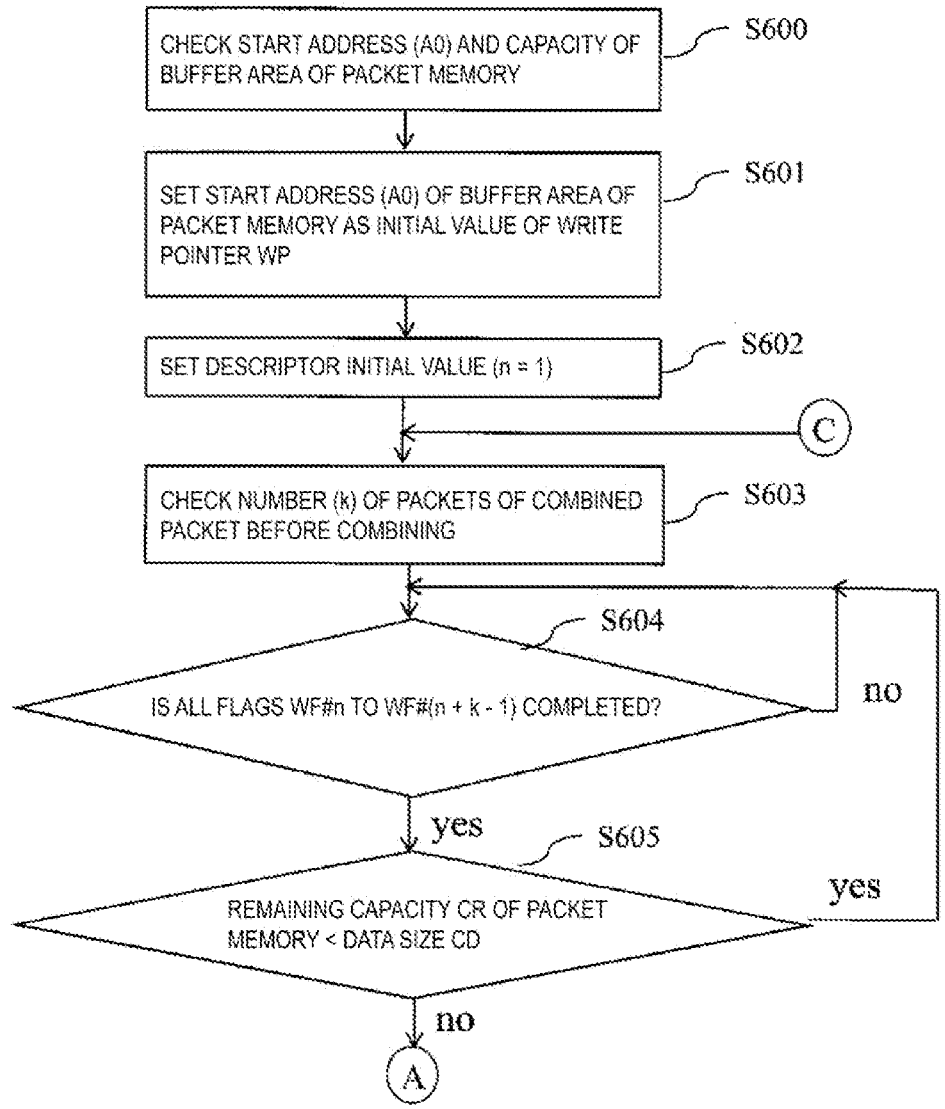
FIG. 12 is a flowchart illustrating operations of a combined packet transferring unit of a packet processing apparatus according to the second embodiment of the present disclosure.

As illustrated in FIG. 11, the configuration of the descriptor 1130 is equivalent to the configuration of the descriptor 1110 according to the first embodiment. However, in the present embodiment, instead of the combined packet transferring unit 11, there is a difference in that the combined packet transferring unit 114 (software executed by the processor) performs writing to the descriptor 1130.

FIGS. 12 to 16 are flowcharts illustrating the operation of the combined packet transferring unit 114 (software executed by the processor). When a transfer request is issued from the packet combining unit 110, in the case of the first transfer request after the initial setting, the combined packet transferring unit 114 reads the start address A0 and the capacity (size) C0 set by the transfer management unit 112 from the control register 113 (step S600 in FIG. 12). Then, the combined packet transferring unit 114 sets the start address A0 as the initial value of the write pointer WP (step S601 in FIG. 12).

Subsequently, the combined packet transferring unit 114 performs the process of steps S602 to S606, which is equivalent to the process of steps S402 to S406. When the value (WP+CD) obtained by adding the size CD of the data to the write pointer WP is smaller than the upper limit value (A0+C0) (yes in step S606 in FIG. 13), the combined packet transferring unit 114 writes into the descriptor 1130, received data sizes L #n to L #(n+k−1) indicating packet lengths of k packets configuring the data to be transferred to the packet memory 101, based on the information (the size of each of packets that have been combined) notified from the packet combining unit 110 (step S607 in FIG. 13).

Figure 13:
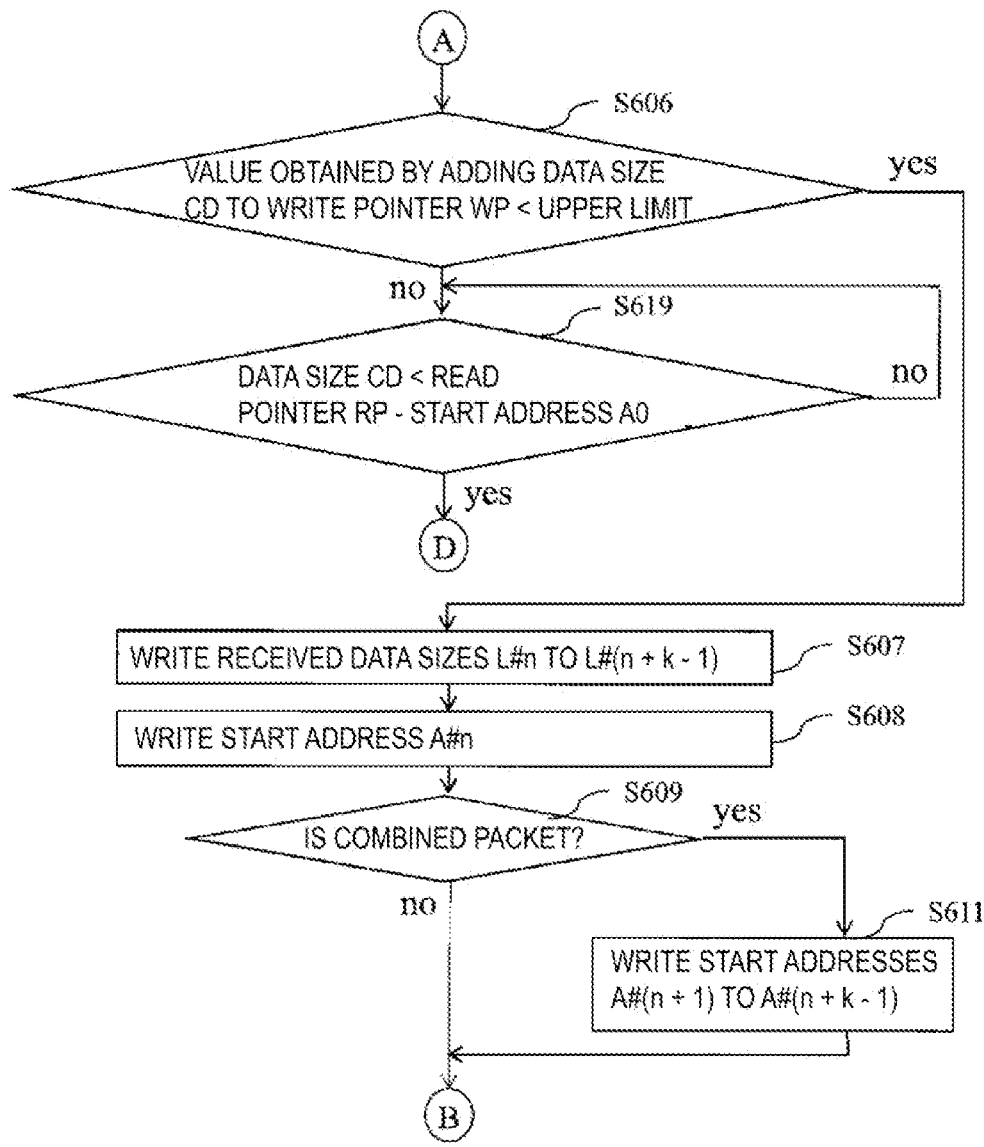
FIG. 13 is a flowchart illustrating operations of a combined packet transferring unit of a packet processing apparatus according to the second embodiment of the present disclosure.

The processes of steps S608 to S611 in FIG. 13 are equivalent to the processes of steps S408 to S411 in FIG. 5.

Figure 14:
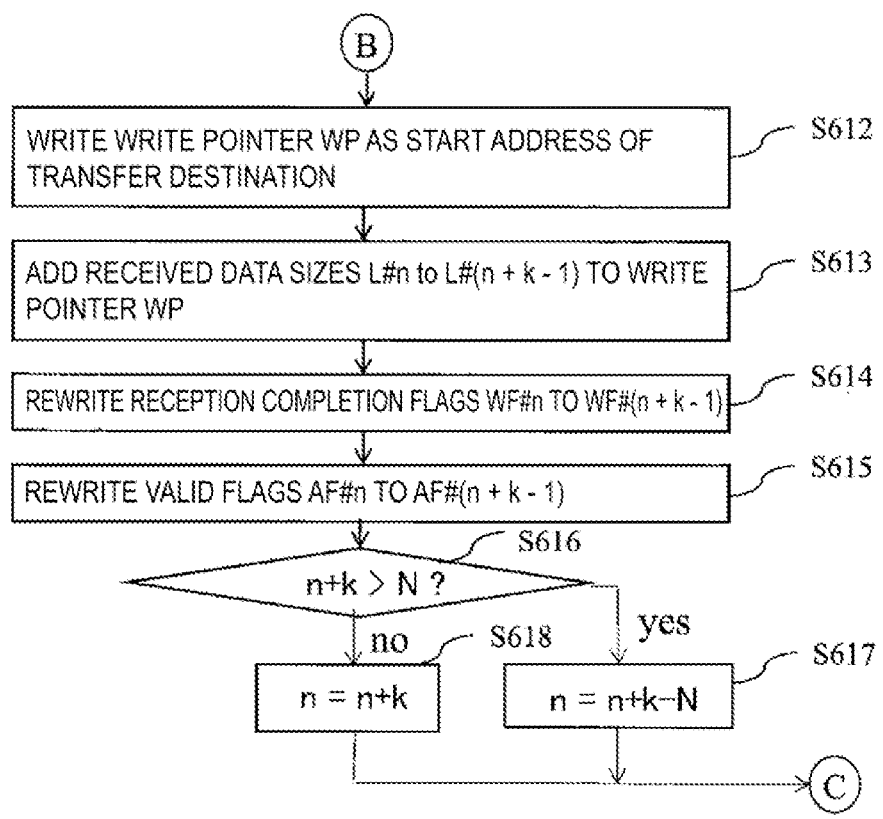
FIG. 14 is a flowchart illustrating operations of a combined packet transferring unit of a packet processing apparatus according to the second embodiment of the present disclosure.

Next, the combined packet transferring unit 114 uses the write pointer WP as the start address of the transfer destination of the packet memory 101 and writes data (separate packets or combined packet) to be transferred to the packet memory 101 into the buffer area starting from the start address of the transfer destination of the packet memory 101 (step S612 in FIG. 14).

The processes of steps S613 to S618 in FIG. 14 are equivalent to the processes of steps S413 to S418 in FIG. 6. The combined packet transferring unit 114 returns to step S603 after the process of step S617 or S618.

Further, when a value (WP+CD) obtained by adding the write pointer WP to the size CD of the data to be transferred to the packet memory 101 is greater than or equal to the upper limit (A0+C0) (no in step S606 in FIG. 13), the combined packet transferring unit 114 compares the size CD of the data to the value (RP−A0) obtained by subtracting the start address A0 of the buffer area in the packet memory 101 from the read pointer RP (step S619 in FIG. 13).

Figure 15:
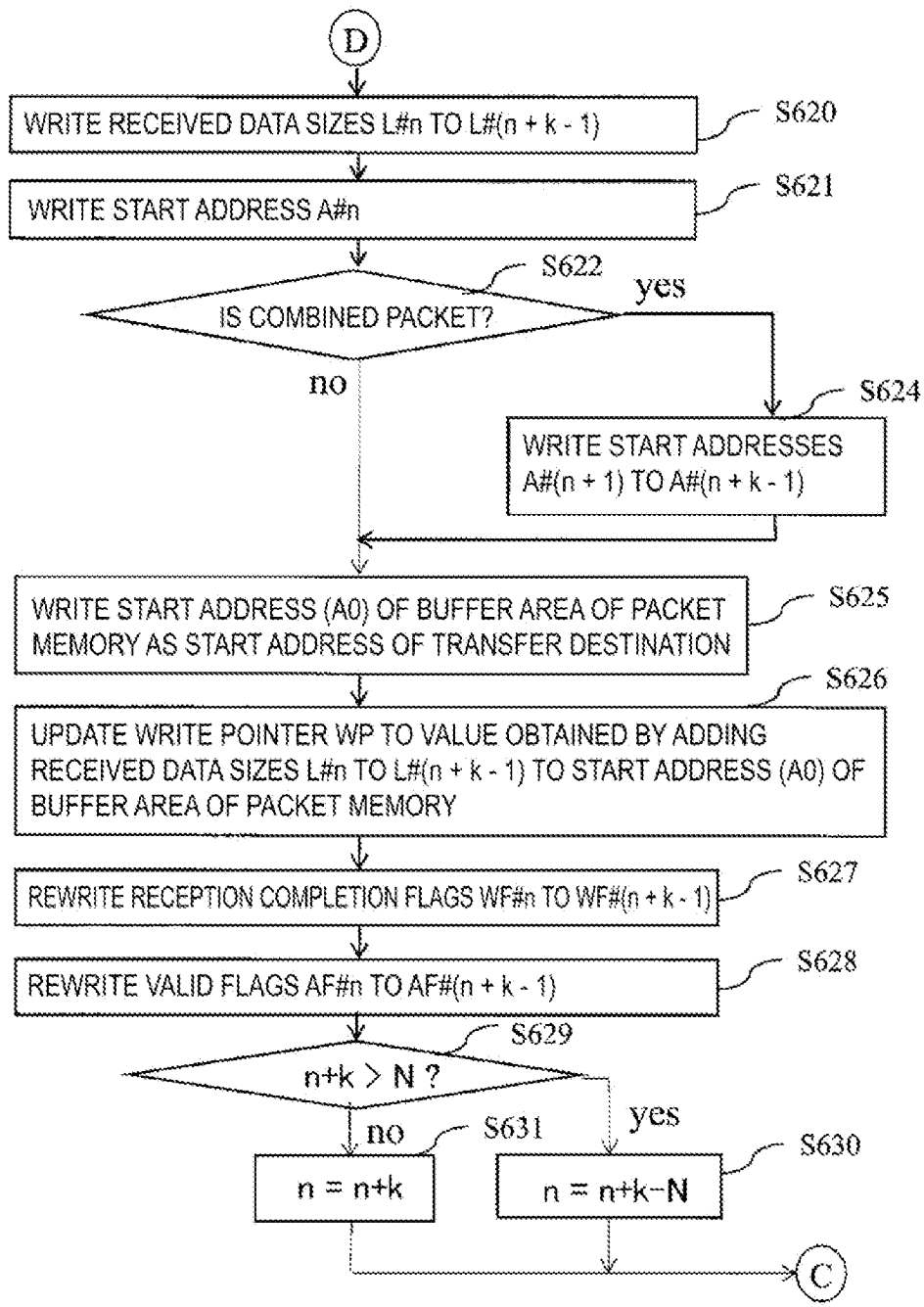
FIG. 15 is a flowchart illustrating operations of a combined packet transferring unit of a packet processing apparatus according to the second embodiment of the present disclosure.

When the size CD of the data is smaller than the subtraction value (RP−A0) (yes in step S619), the combined packet transferring unit 114 writes into the descriptor 1130, received data sizes L #n to L #(n+k−1) indicating packet lengths of k packets configuring the data to be transferred to the packet memory 101, based on the information (the size of each of packets that have been combined) notified from the packet combining unit 110 (step S620 in FIG. 15).

The processes of steps S621 to S624 in FIG. 15 are equivalent to the processes of steps S421 to S424 in FIG. 7.

Next, the combined packet transferring unit 114 writes the data (separate packets or combined packet) to be transferred to the packet memory 101 into the buffer area starting from the start address A0 of the packet memory 101 (step S625 in FIG. 15).

The processes of steps S626 to S631 in FIG. 15 are equivalent to the processes of steps S426 to S431 in FIG. 7. The combined packet transferring unit 114 returns to step S603 after the process of step S630 or S631.

Next, the update process of the read pointer RP by the combined packet transferring unit 114 will be described. First, the combined packet transferring unit 114 sets as the initial value of the read pointer RP, a start address A0 of the buffer area for the combined packet of the packet memory 101 (step S640 in FIG. 9). Further, the combined packet transferring unit 114 initializes the variable n indicating the checking order of the valid flag to 1 (step S641 in FIG. 9).

Note that the variable n and the variable n in FIGS. 12 to 15 are the same values, so that the process of step S641 is the same as the process of step S602.

Figure 16:
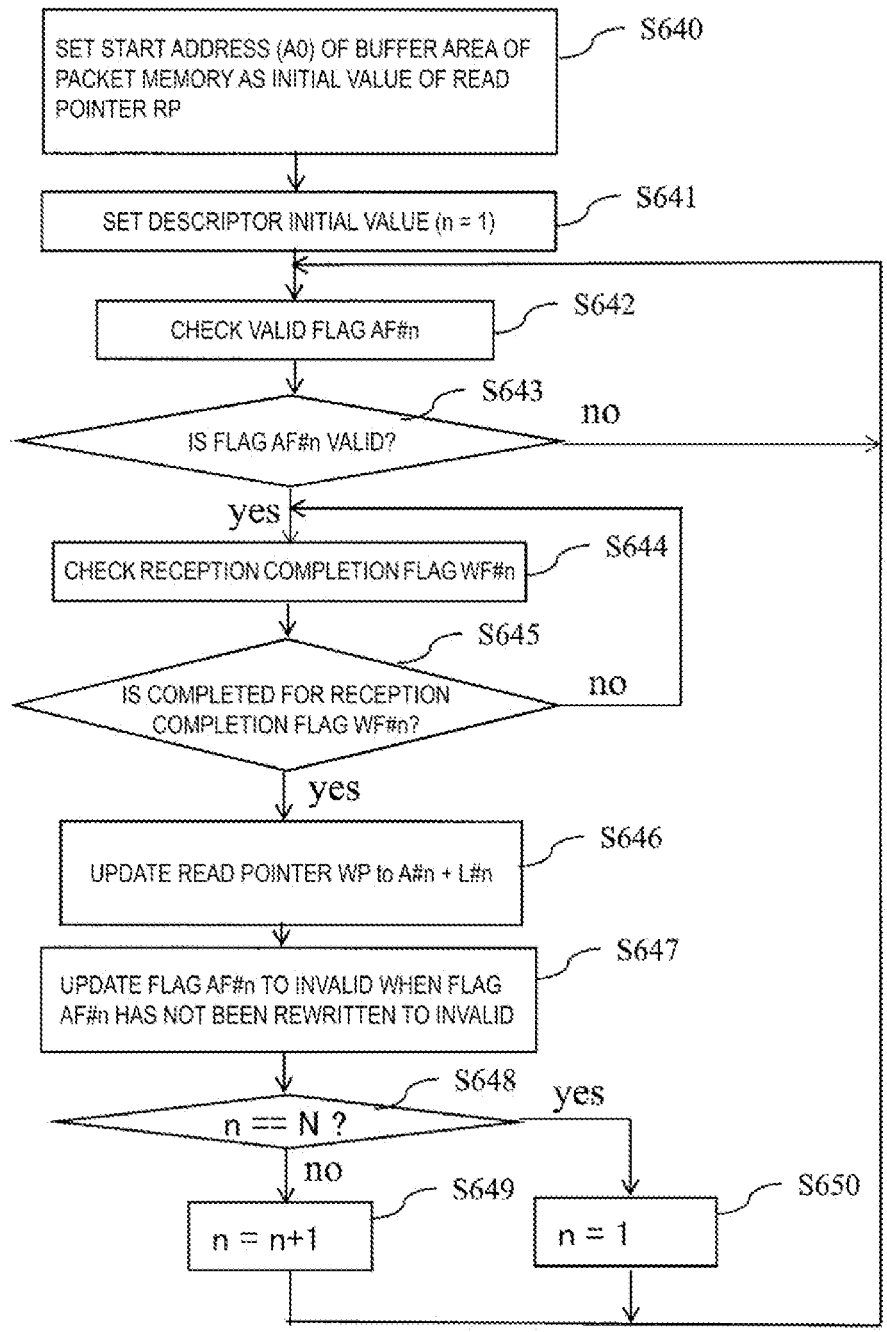
FIG. 16 is a flowchart illustrating operations of a combined packet transferring unit of a packet processing apparatus according to the second embodiment of the present disclosure.

The processes of steps S642 to S650 in FIG. 16 are equivalent to the processes of steps S442 to S450 in FIG. 9.

In this way, the packet processing apparatus of the present embodiment is provided with a unit (combined packet transferring unit 114) which is capable of implementing collective writing and writes into the descriptor 1130, information for restoring the combined packet to the plurality of original packets. According to the present embodiment, execution of the reception processing unit 103 of the restoration process, the protocol processing unit 104, or the combined packet separating unit 108 illustrated in FIG. 23 is not necessary, and high reception performance owing to effects of collective writing can be implemented.

Figure 24:
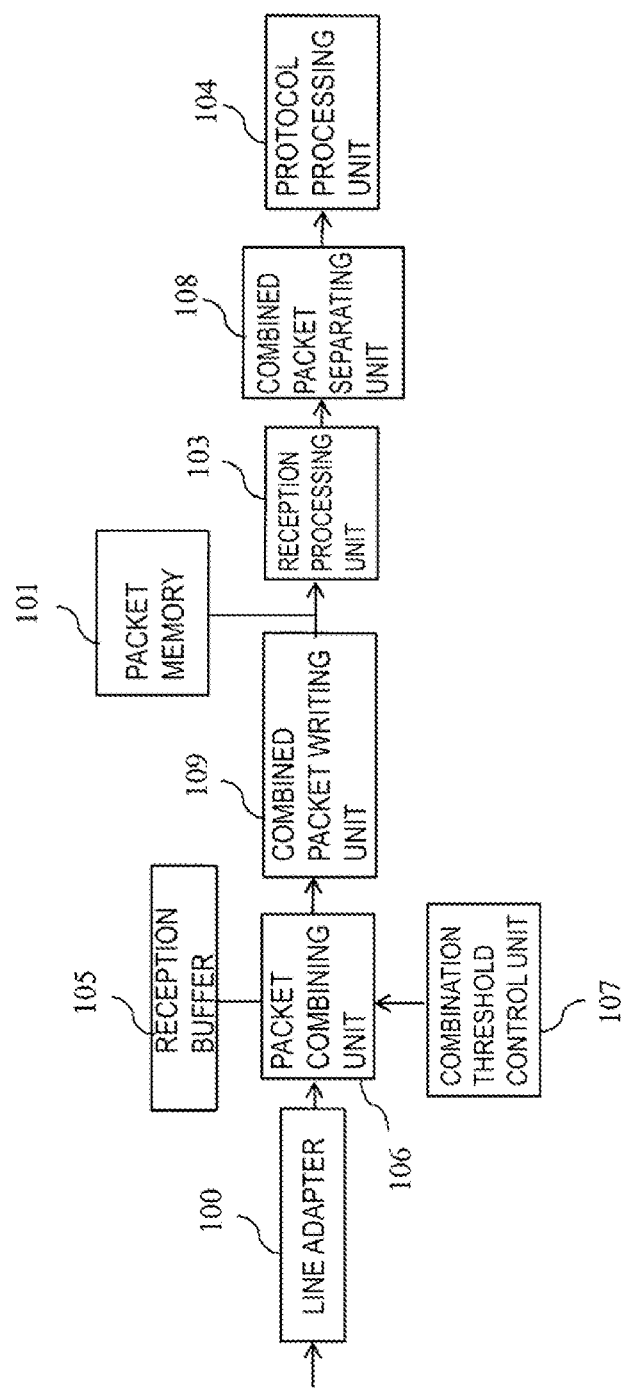
FIG. 24 is a block diagram illustrating another configuration of the packet processing apparatus in the related art.

Here, the amount of wasted area is compared when the size of the buffer area that is secured in the packet memory 101 in the packet processing apparatus of the present embodiment is made the same as the size required in the configuration of FIG. 24 in the related art.

In the configuration of FIG. 24 of the related art, in order to successfully perform the collective writing, it is necessary to secure a buffer area of N×DB_mux (DB_mux is the maximum size of the combined packet) in the packet memory 101 in advance by the software for reception processing (for read processing). The maximum size DB_mux of the combined packet is a value obtained by adding the maximum allowable packet length to the threshold set in the combination threshold control unit 107. Thus, for example, assuming that the threshold is 500 bytes, the maximum allowable packet length is 2000 bytes, and N is 10, the size of the buffer area that needs to be secured in the packet memory 101 in the configuration of FIG. 24 in the related art is 10×2500=25000 bytes.

When the threshold is 500 bytes, the maximum allowable packet length is 2000 bytes, and N is 10 as described above, the size of the combined packets actually transferred to the packet memory 101 is 501 bytes to 2500 bytes. That is, in the configuration of FIG. 24 of the related art, when the size of each combined packet is S, an area obtained by adding (2500−S) for 10 combined packets is wasted. This indicates that the area of 10000 bytes out of 25000 bytes is wasted, assuming that the average of the size S of the combined packets is 1500 bytes.

When 25000 bytes is a size of a buffer area that is secured in the packet memory 101 in the configuration of the present embodiment, 25000 bytes is secured in a continuous area, and a plurality of combined packets can be written to the continuous area. Thus, only the value obtained by subtracting 1 byte from the maximum size 2500 bytes of the combined packet, that is, 2499 bytes, is wasted in the present embodiment. This value indicates that when the average of the sizes S of the combined packets is smaller than (25000−2499)/10=2250.1, if N is 11 or greater, then 11 or more combined packets are written into the buffer of the same capacity (25000 bytes). In the configuration of FIG. 24 in the related art, N is 11 or higher and the buffer area of 27500 bytes or more is required in order to write 11 or more combined packets.

Thus, when the size of the buffer area that is secured in the packet memory 101 in the packet processing apparatus of the present embodiment is made the same as the size required in the configuration of FIG. 24 in the related art, the area that is wasted is smaller than in the configuration of FIG. 24 in the related art, and a larger number of combined packets may be written into the same size of buffer area.

Assuming that the average of the size S of the combined packets is at most 1500 bytes and the maximum number of combined packets to be written into the buffer area is 10, the size of the buffer area to be secured in the packet memory 101 in the packet processing apparatus of the present embodiment is 1500×10=15000 bytes, and is smaller than the size (25000 bytes) required in the configuration of FIG. 24 in the related art.

In the packet processing apparatus of the present embodiment, the combined packet transferring unit 114 writes the information (start address, received data size, reception completion flag) of the descriptor 1130, whereby a restoration process is not required.

As in the related art, in order to implement the restoration process using the reception processing unit 103, the protocol processing unit 104, or the combined packet separating unit 108 illustrated in FIG. 24, a mechanism for the packet combining unit 106 to notify the reception processing unit 103 and the protocol processing unit 104 or the combined packet separating unit 108 illustrated in FIG. 24 of information (the number of packets of the combined packet and the size of each packet) required for the restoration process is required.

As in the related art, in addition, in order to implement the restoration process using the reception processing unit 103, the protocol processing unit 104, or the combined packet separating unit 108 illustrated in FIG. 24, it should be considered that information, which is required for the restoration process, corresponding to a plurality of combined packets needs to be stored depending on a situation until a reception process is activated after completion of the collective writing.

In contrast to this, in the packet processing apparatus according to the present embodiment, the restoration process for a combined packet is completed at a time point at which collective writing of one combined packet is completed, and thus, information corresponding to a plurality of combined packets does not need to be stored. Thus, the scale of the hardware according to the present embodiment is smaller than that of a case in which the restoration process is implemented using the reception processing unit 103, the protocol processing unit 104, or the combined packet separating unit 108 illustrated in FIG. 24. This is the same also when compared to a case in which the process of restoring a combined packet into a plurality of original packets is implemented by software.

For example, as in the related art, when all the components other than the packet memory 101 and the line adapter 100 are implemented in software in the configuration of FIG. 24, by implementing the process of writing to the packet memory 101 and the reception process that includes the restoration process are implemented in different processors (or virtual machines), until the reception process is activated after completion of writing to the packet memory 101, it is necessary to hold information required for the restoration process for a plurality of combined packets in some cases, so that it is necessary to hold the information required for the restoration process for a plurality of combined packets (the number of packets of the combined packet, the size of each packet) in the packet memory 101 or the like.

In contrast to this, when all the components other than the packet memory 101 and the line adapter 100 are implemented in software in the configuration according to the present embodiment, even when the process of writing to the packet memory 101 and the reception process that does not include the restoration process are implemented in different processors (or virtual machines), by implementing the process of writing to the packet memory 101 and the restoration process in the same processor (or virtual machine or the like), it is not necessary to hold information for a plurality of pieces of combined packets (number of packets of the combined packet, size of each packet), that is, the information (the number of packets of the combined packet, the size of each packet) required for the restoration process for only one combined packet may be held in the packet memory 101 or the like.

In other words, in the configuration according to the present embodiment, the capacity (the number of writable bits) of the packet memory 101 or the like used for storing the information (the number of packets of the combined packet and a size of each packet) required for the restoration process may be smaller than that of the configuration illustrated in FIG. 24 in the related art, and thus, the scale of required hardware can be reduced.

Further, as in the related art, as a mechanism for the packet combining unit 106 to notify the reception processing unit 103, the protocol processing unit 104, or the combined packet separating unit 108 illustrated in FIG. 24 of information required for the restoration process, the information required for the restoration process may be written in the packet memory 101. However, in this case, a part of the bandwidth of a bus used for the collective writing is occupied by the information required for the restoration process, so that an effective bandwidth that can be used for writing the original packet data decreases, and, as a result, the performance of collective writing deteriorates.

In the packet processing apparatus of the present embodiment, information required for the restoration process, instead of the packet memory 101, may be held in another memory that does not use a bus to which the packet memory 101 is connected (may write from the packet combining unit 110 and read from the combined packet transferring unit 114), and the degradation of the effective bandwidth as described above does not occur.

As in the first embodiment, as a modification of the present embodiment, the packet combining unit no may be configured to determine a type of packet and collect packets of the same type as a combined packet, or may be configured to selectively use a plurality of descriptors 1130 in accordance with a type of packet. When a configuration in which a descriptor 1130 is prepared for each type of packet, and a plurality of descriptors 1130 are selectively used in accordance with the type of the packet, a different reception process may be easily performed for each type of packet.

In addition, in the present embodiment, a configuration in which a plurality of descriptors 1130 are selectively used for each core of the processor in which a plurality of CPU cores are built may be employed, or a configuration in which a plurality of descriptors 1130 are selectively used for each virtual machine may be employed. By employing the configuration in which the plurality of descriptors 1130 are selectively used for each CPU core or for each virtual machine, the performance of a writing process and a reading process implemented by software can be improved compared to a case in which there is only one descriptor 1130.

In the packet processing apparatuses of the first and second embodiments, the packet memory 101, the transfer management unit 112, the reception processing unit 103, the protocol processing unit 104, and the combined packet transferring unit 114 may be implemented by a computer provided with a processor, a storage apparatus, and an interface, and a program for controlling the hardware resources.

In such a computer, a program for implementing the packet processing method of embodiments of the present disclosure is stored in the storage apparatus. The processor executes the processes described in the first and second embodiments in accordance with the program stored in the storage apparatus. As described above, a part of the processes of the combined packet transferring unit 111 can also be implemented by a computer.

INDUSTRIAL APPLICABILITY

Embodiments of the present disclosure can be applied to technologies that perform a protocol process, a transferring process, or the like of communication data.

REFERENCE SIGNS LIST

100 Line adapter
101 Packet memory
103 Reception processing unit
104 Protocol processing unit
105 Reception buffer
107 Combination threshold control unit
110 Packet combining unit
111, 114 Combined packet transferring unit
112 Transfer management unit
113 Control register
1110, 1130 Descriptor
1111 DMA controller

The invention claimed is:

1. A packet processing apparatus comprising:
   a line adapter configured to receive packets from a communication line;
   a packet combiner configured to generate a combined packet by combining the packets received from the communication line;
   a packet memory configured to store the combined packet generated by the packet combiner; and
   a combined packet transferring device configured to:
   determine an address of start data of each packet in the combined packet stored on the packet memory,
   write information of the address of the start data of each packet in the combined packet into a descriptor, wherein the descriptor is a predetermined data area on the packet memory, wherein the address of the start data of each packet in the combined packet is an address of the packet memory, and
   direct memory access (DMA) transfer the combined packet generated by the packet combiner to the packet memory or write the combined packet to the packet memory using a first processor.

2. The packet processing apparatus according to claim 1, wherein the combined packet transferring device is configured to write information of a received data size indicating a packet length of each packet in the combined packet into the descriptor.

3. The packet processing apparatus according to claim 1, further comprising a second processor configured to read the packets in the combined packet stored on the packet memory, wherein the second processor is configured to read the packets in the combined packet stored on the packet memory based on information written in the descriptor to process the packets.

4. The packet processing apparatus according to claim 1, further comprising a reception processor configured to deliver the packets stored in the packet memory to a protocol processor configured to perform protocol processes on the packets.

5. The packet processing apparatus according to claim 4, wherein the combined packet transferring device is configured to issue a request for activating the reception processor by generating a hardware interruption.

6. The packet processing apparatus according to claim 1, wherein the packet combiner is configured to issue a transfer request when a reception interval between the packets exceeds a predetermined time period.

7. A packet processing method comprising:
- generating a combined packet by combining a plurality of packets received from a communication line;
- determining, for a packet memory, an address of start data of each packet in the combined packet stored on the packet memory;
- processing the plurality of packets received from the communication line by reading the packets from the packet memory;
- writing information of the address of the start data of each packet in the combined packet into a descriptor, wherein the descriptor is a predetermined data area on the packet memory, wherein the address of the start data of each packet in the combined packet is an address of the packet memory; and
- direct memory access (DMA) transferring the combined packet to the packet memory or writing the combined packet to the packet memory.

8. The packet processing method according to claim 7, further comprising writing information of a received data size indicating a packet length of each packet in the combined packet into the descriptor.

9. The packet processing method according to claim 7, further comprising reading the packets from the packet memory based on information written in the descriptor to process the packets.

10. The packet processing method according to claim 7, further comprising:
- writing information of a received data size indicating a packet length of each packet in the combined packet into the descriptor; and
- reading the packets from the packet memory based on information written in the descriptor to process the packets.

* * * * *